US009501411B2

(12) United States Patent
Guthrie et al.

(10) Patent No.: US 9,501,411 B2
(45) Date of Patent: Nov. 22, 2016

(54) CACHE BACKING STORE FOR TRANSACTIONAL MEMORY

(71) Applicant: INTERNATIONAL BUSINESS MACHINES CORPORATION, Armonk, NY (US)

(72) Inventors: Guy L. Guthrie, Austin, TX (US); Hien M. Le, Cedar Park, TX (US); William J. Starke, Round Rock, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/473,687

(22) Filed: Aug. 29, 2014

(65) Prior Publication Data

US 2016/0062891 A1  Mar. 3, 2016

(51) Int. Cl.
*G06F 12/08* (2016.01)
*G06F 9/46* (2006.01)
*G06F 12/12* (2016.01)

(52) U.S. Cl.
CPC .......... *G06F 12/0833* (2013.01); *G06F 9/467* (2013.01); *G06F 12/0811* (2013.01); *G06F 12/0897* (2013.01); *G06F 12/12* (2013.01); *G06F 12/0815* (2013.01); *G06F 2212/283* (2013.01); *G06F 2212/62* (2013.01); *G06F 2212/621* (2013.01); *G06F 2212/69* (2013.01)

(58) Field of Classification Search
CPC ........................ G06F 12/0897; G06F 12/0815
USPC .................................................. 711/122, 141
See application file for complete search history.

(56) References Cited

U.S. PATENT DOCUMENTS

| 7,890,725 | B2 | 2/2011 | Von Praun et al. | |
| 7,958,319 | B2 | 6/2011 | Saha et al. | |
| 7,984,248 | B2 * | 7/2011 | Kottapalli et al. | 711/152 |
| 8,095,824 | B2 | 1/2012 | Gray et al. | |
| 8,132,158 | B2 * | 3/2012 | Wang et al. | 717/127 |
| 8,321,637 | B2 | 11/2012 | Baum et al. | |
| 2010/0332538 | A1 * | 12/2010 | Gray et al. | 707/774 |
| 2013/0042094 | A1 | 2/2013 | Heller, Jr. | |

(Continued)

OTHER PUBLICATIONS

Guthrie et al., "Cache Backing Store for Transactional Memory", U.S. Appl. No. 14/523,229, Non-Final Office Action dated Mar. 18, 2016.

(Continued)

*Primary Examiner* — Than Nguyen
(74) *Attorney, Agent, or Firm* — Brian F. Russell; Steven L. Bennett

(57) ABSTRACT

In response to a transactional store request, the higher level cache transmits, to the lower level cache, a backup copy of an unaltered target cache line in response to a target real address hitting in the higher level cache, updates the target cache line with store data to obtain an updated target cache line, and records the target real address as belonging to a transaction footprint of the memory transaction. In response to a conflicting access to the transaction footprint prior to completion of the memory transaction, the higher level cache signals failure of the memory transaction to the processor core, invalidates the updated target cache line in the higher level cache, and causes the backup copy of the target cache line in the lower level cache to be restored as a current version of the target cache line.

12 Claims, 20 Drawing Sheets

(56) References Cited

U.S. PATENT DOCUMENTS

2015/0089152 A1* 3/2015 Busaba et al. ............... 711/141
2015/0205721 A1* 7/2015 Diestelhorst et al. ........ 711/122

OTHER PUBLICATIONS

Guthrie et al., "Cache Backing Store for Transactional Memory", U.S. Appl. No. 14/523,229, Notice of Allowance dated Aug. 9, 2016.

* cited by examiner

CACHE BACKING STORE FOR TRANSACTIONAL MEMORY

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

In at least some embodiments, in response to a transactional store request, the higher level cache transmits, to the lower level cache, a backup copy of an unaltered target cache line in response to a target real address hitting in the higher level cache, updates the target cache line with store data to obtain an updated target cache line, and records the target real address as belonging to a transaction footprint of the memory transaction. In response to a conflicting access to the transaction footprint prior to completion of the memory transaction, the higher level cache signals failure of the memory transaction to the processor core, invalidates the updated target cache line in the higher level cache, and causes the backup copy of the target cache line in the lower level cache to be restored as a current version of the target cache line.

DETAILED DESCRIPTION

Figure 1:
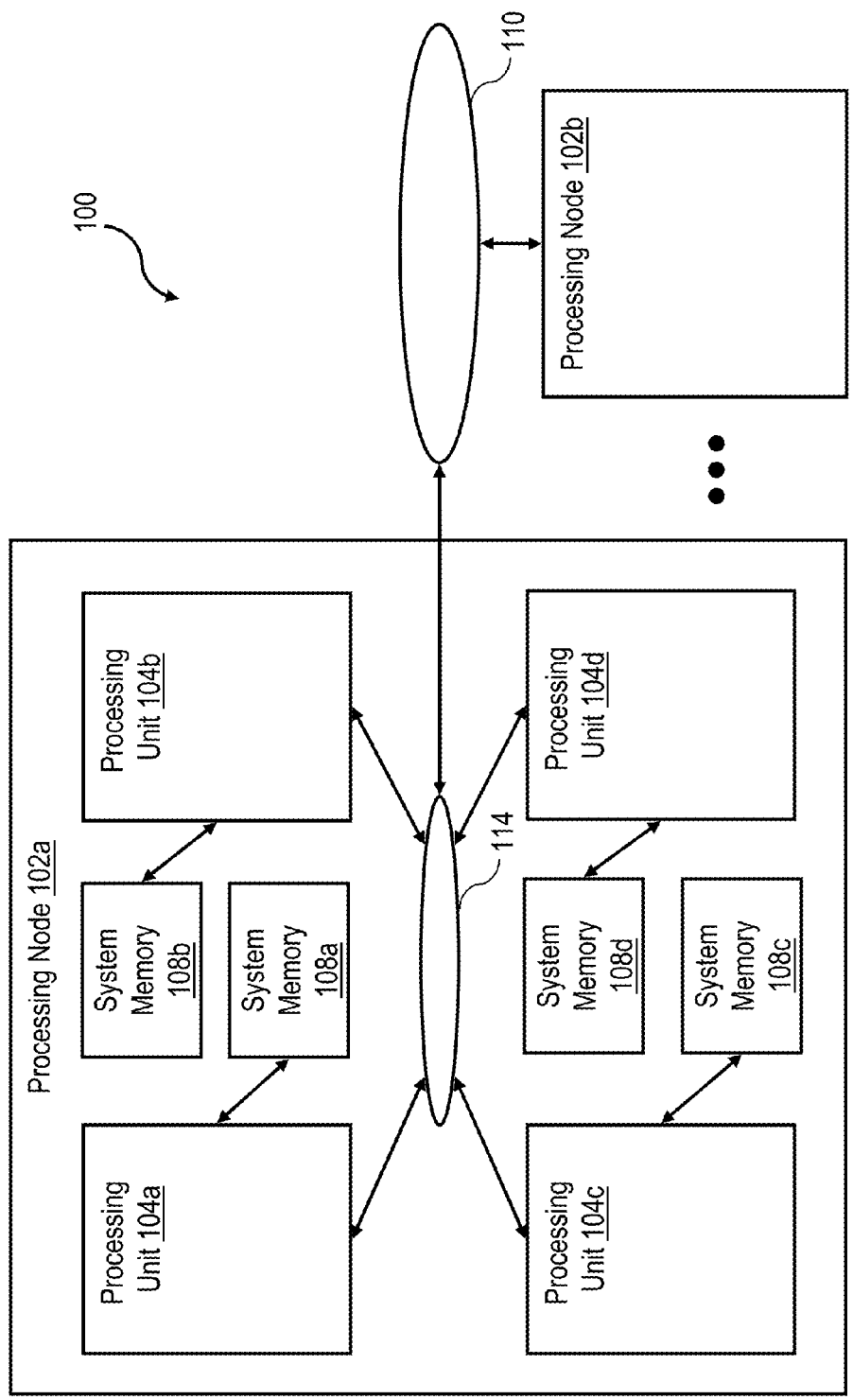
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model, so called "barrier" (e.g., SYNC) instructions are typically provided to allow the programmer to specify what memory access operation orderings and atomicity are to be applied during execution of the multiprocessor program.

Figure 2:
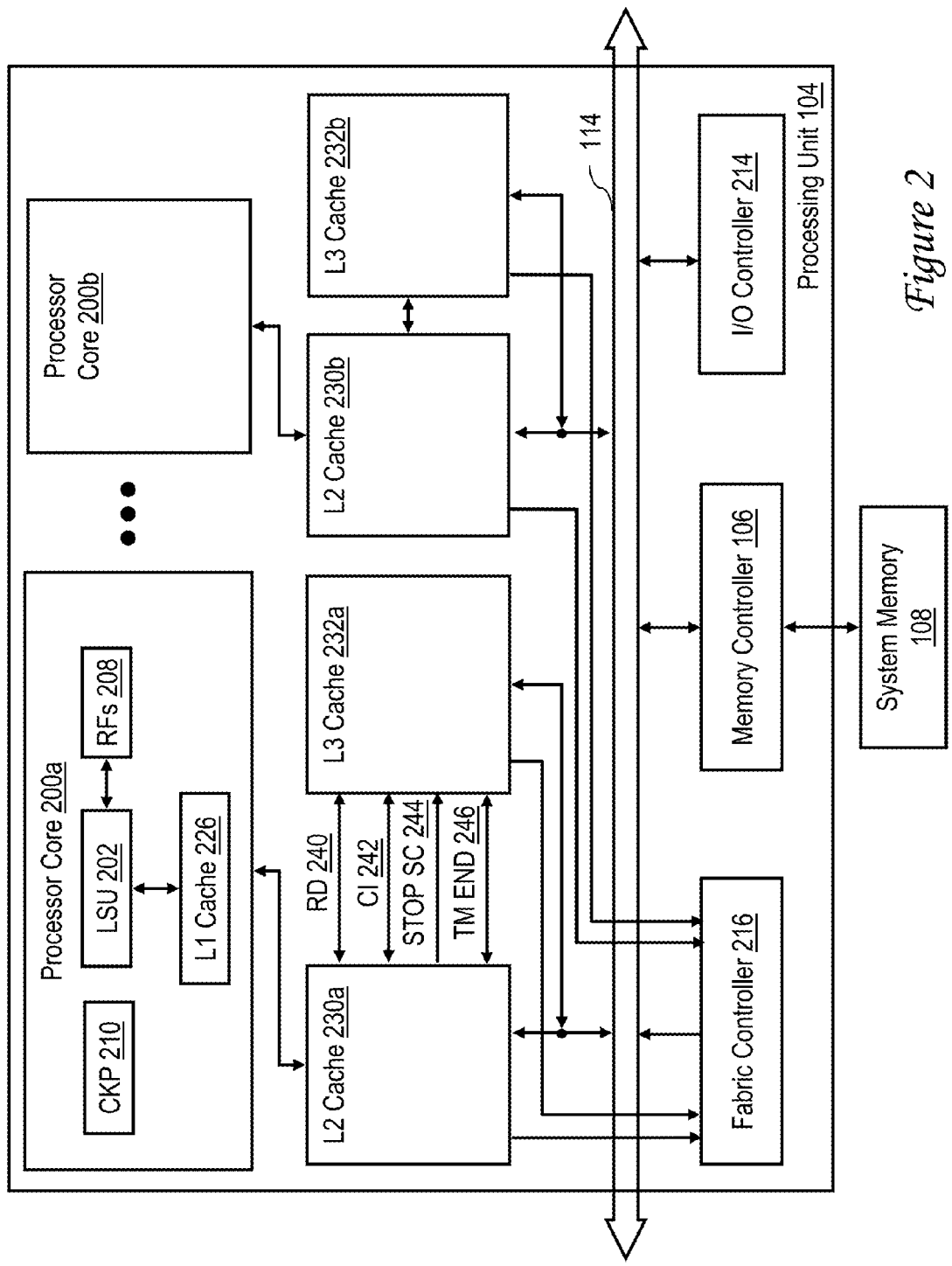
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In some embodiments, each processor core 200 is capable of independently executing multiple simultaneous hardware threads of execution. However, in order to avoid obscuring the invention in the following description processing units 104 are generally described with respect to an embodiment in which each processor core 200 can execute only a single thread at a time. Modifications and/or additions to the described embodiment required to apply the principles and techniques to processing units having processor cores supporting SMT execution that are not explicitly described herein will be apparent to those skilled in the art.

As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, a respective store-in level two (L2) cache 230a, 230b for each processor core 200a, 200b, and a respective lookaside level three (L3) victim cache 232a, 232b for each processor core 200a, 200b populated with cache lines evicted from one or more of L2 caches 230. As shown in detail for L2 cache 230a and L3 cache 232a, each L2-L3 cache interface includes a number of channels, including read (RD) channel 240, cast-in (CI) channel 242, STOP SC channel 244 and TM END channel 246. Each of L2 caches 230 and L3 caches 232 is further coupled to local interconnect 114 and to a fabric controller 216 to facilitate participation of caches 230, 232 in the coherent data communication of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access (e.g., load or store) instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate a transaction including the memory access request on the system fabric.

Figure 3:
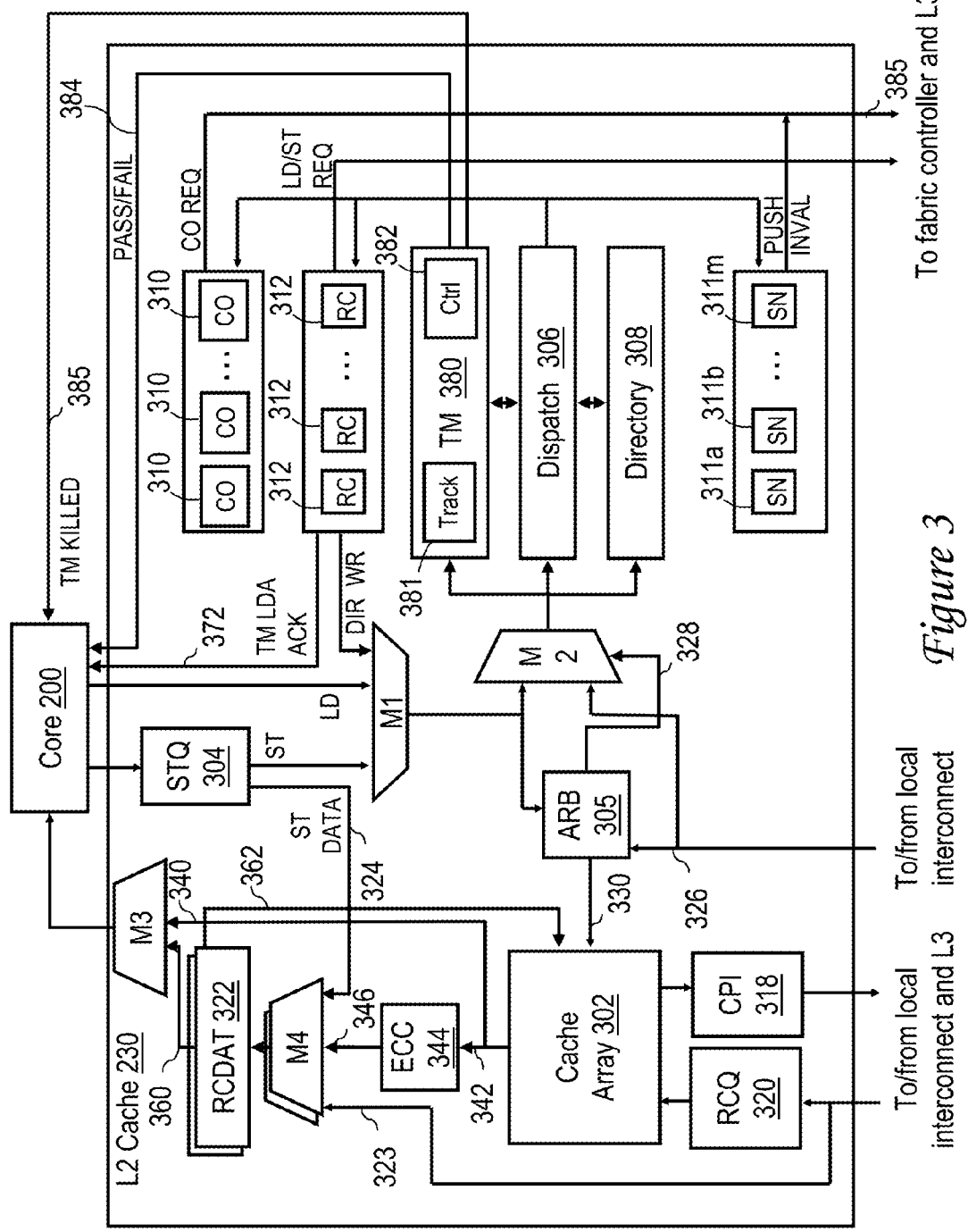
FIG. 3 is a more detailed block diagram of a level two (L2) cache supporting memory transactions in accordance with one embodiment.

With reference now to FIG. 3, there is illustrated a more detailed block diagram of an exemplary embodiment of an L2 cache 230 that supports memory transactions in accordance with one embodiment. As shown in FIG. 3, L2 cache 230 includes a cache array 302 and a L2 directory 308 of the contents of cache array 302. Although not explicitly illustrated, cache array 302 preferably is implemented with a single read port and single write port to reduce the die area required to implement cache array 302.

Assuming cache array 302 and L2 directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in L2 directory 308 includes various fields, for example, a tag field that identifies the real address of the memory block held in the corresponding cache line of cache array 302, a state field that indicate the coherency state of the cache line, an LRU (Least Recently Used) field indicating a replacement order for the cache line with respect to other cache lines in the same congruence class, and inclusivity bits indicating whether the memory block is held in the associated L1 cache 226.

L2 cache 230 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 230 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 230 also includes CO (castout) machines 310 that manage the removal of memory blocks from cache array 302 and the storage of those memory blocks in system memory 108 (i.e., writebacks) or the affiliated L3 cache 232 (i.e., L3 cast-ins).

L2 cache 230 further includes an arbiter 305 that controls multiplexers M1-M2 to order the processing of local memory access requests and memory transaction requests (e.g., corresponding to the tbegin and tend, instructions described further herein) received from the affiliated processor core 200 and remote memory access requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each memory access request with respect to L2 directory 308 and cache array 302 and, if necessary and the required resource is available, dispatches the memory access request to the appropriate state machine for handling.

As described in greater detail below, L2 cache 230 also includes transactional memory (TM) logic 380, which supports execution of memory transactions by the associated processor core 200. TM logic 380 includes TM tracking logic 381 that tracks transactional memory access (e.g., load and store) instructions within the memory transactions to ensure that they complete in an atomic fashion or fail in the presence of a conflict. TM logic 380 further includes transactional control logic 382, which controls the sequencing of a memory transaction and provides a pass/fail indication 384 and an optional TM killed indication 385 to the associated processor core 200. Pass/fail indication 384 indicates to processor core 200 whether or not a memory transaction successfully committed to the distributed shared memory system at the end of the memory transaction. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction prior to reaching its end.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that CO machines 310 and snoopers 311 direct transfer of data from cache array 302 (e.g., to another L2 cache 230, to the associated L3 cache 232, or to a system memory 108) via only their respective designated CPI buffer entries.

Each RC machine 312 also has assigned to it a respective one of multiple RC data (RCDAT) buffers 322 for buffering a memory block read from cache array 302 and/or received from local interconnect 114 via reload bus 313. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in L2 directory 308, and if the memory address hits, the coherency state of the target memory block. The directory information, which includes a hit/miss indication and the coherency state of the memory block, is returned by L2 directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of L2 directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in L2 directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 313, store data multiplexer M4, RCDAT buffer 322 (with store merge for a store miss) and data path 362.

Figure 4:
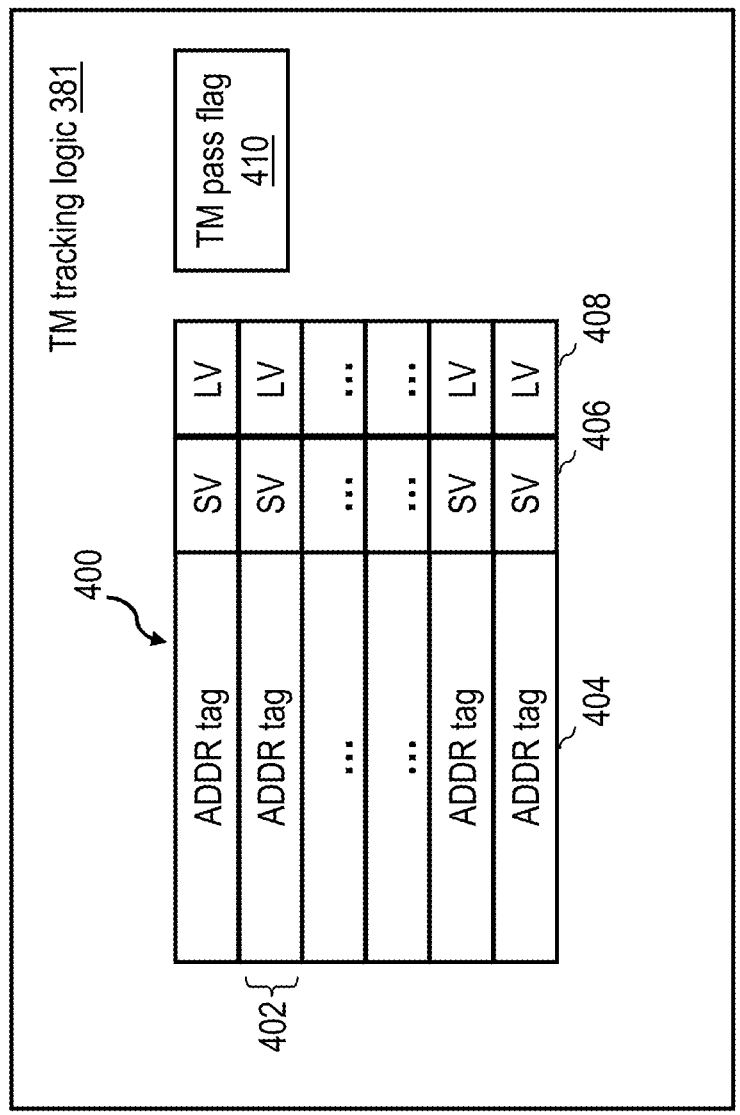
FIG. 4 is a more detailed block diagram of exemplary transactional memory (TM) tracking logic in the L2 cache of FIG. 3 in accordance with one embodiment.

Referring now to FIG. 4, there is illustrated a more detailed view of TM tracking logic 381 of L2 cache 230 in accordance with one embodiment. As depicted, TM tracking logic 381 includes a TM pass flag 410. TM tracking logic 381 sets TM pass flag 410 to indicate a memory transaction under execution by the associated processor core 200 is currently passing and resets TM pass flag 410 to indicate that the memory transaction has failed. In addition, TM tracking logic 381 further includes a TM directory 400 that records the transaction footprint of the memory transaction under execution by the associated processor core 200. TM directory 400 contains a number of entries 402, which in the depicted embodiment, each include at least three fields: address tag field 404, store valid (SV) field 406, and load valid (LV) field 408. Address tag field 404 indicates the real memory address of a cache line that is in the transaction footprint of an active memory transaction. SV field 406 and LV field 408 respectively indicate whether the cache line is part of the store footprint or load footprint of the memory transaction. In at least one embodiment, SV field 406 and LV field 408 are mutually exclusive, meaning that, for a given entry 402, one or neither of SV field 406 and LV field 408 may be set concurrently but not both. When both of fields 406 and 408 are reset, the entry 402 is invalid and no cache line is then being tracked by that entry 402.

In embodiments in which processor cores 200 support simultaneous multithreading (SMT), LV field 408 can include one bit per hardware thread, with multiple LV bits possibly being active at a time. Because only one thread at a time can have a given cache line in the store footprint of its memory transaction, SV field 406 can be implemented with a single bit and an associated thread ID indicator in SMT embodiments. Those skilled in the art will appreciate that in SMT embodiments, TM tracking logic 381 will further include appropriate logic for handling cross-thread collisions.

When a transactional load of a memory transaction is presented to TM logic 380 and there is no entry in TM directory 400 for the target cache line of the transactional load, a new entry 402 is allocated, the address tag field 404 of the new entry is updated with the address tag of the target cache line, and the LV field 408 is set. If, on the other hand, an existing entry 402 is already tracking the target cache line (and therefore either LV field 408 or SV field 406 is already set), no update to the existing entry 402 is made because the target cache line of the transactional load is already being tracked.

As with a transactional load, if a transactional store is presented to TM logic 380 and there is no entry in TM directory 400 for the target cache line of the transactional store, a new entry 402 is allocated, the address tag field 404 of the new entry is updated with the address tag of the target cache line, and the SV field 406 is set. If, on the other hand, an existing entry 402 is already tracking the target cache line and LV field 408 is set for that entry 402, then LV field 408 is reset, and SV field 406 is set to indicate that this cache line is now part of the store footprint for the memory transaction. If SV field 406 is already set for the existing entry 402, no update to entry 402 is performed.

In response to an active memory transaction committing or failing, TM tracking logic 381 clears the entries 402 in TM directory 400 and resets TM pass flag 410.

Figure 5:
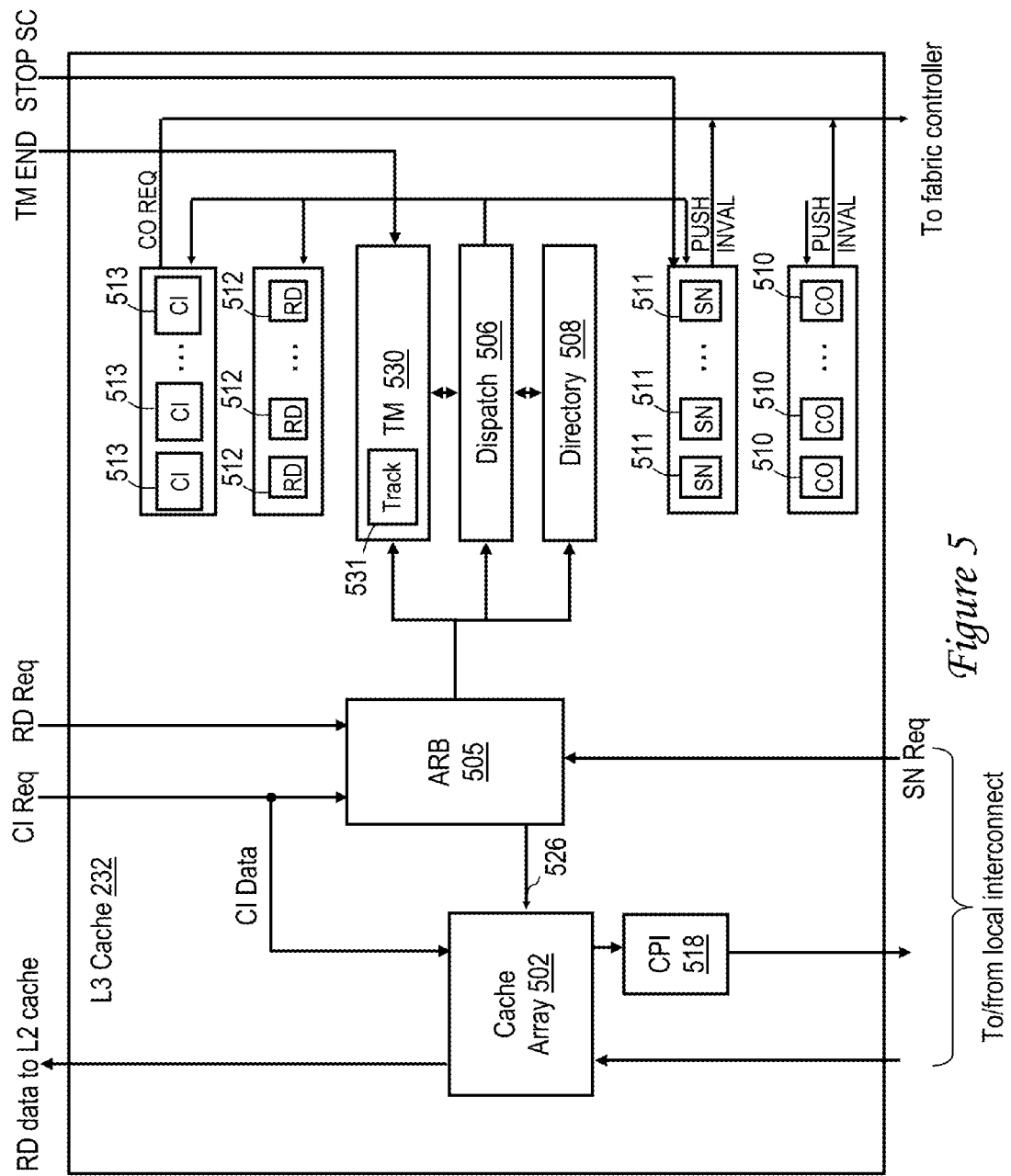
FIG. 5 is a detailed block diagram of level three (L3) cache supporting memory transactions in accordance with one embodiment.

With reference now to FIG. 5, there is illustrated a more detailed block diagram of an exemplary embodiment of an L3 cache 232 that supports memory transactions of its associated processor core 200 in accordance with one embodiment. As shown in FIG. 5, L3 cache 232 includes a cache array 502 and a L3 directory 508 of the contents of cache array 502. Assuming cache array 502 and L3 directory 508 are set-associative as is conventional, memory locations in system memories 108 are mapped to particular congruence classes within cache array 502 utilizing predetermined index bits within the system memory (real) addresses. The particular memory blocks stored within the cache lines of cache array 502 are recorded in L3 directory 508, which contains one directory entry for each cache line. While not expressly depicted in FIG. 5, it will be understood by those skilled in the art that each directory entry in L3 directory 508 includes various fields, for example, a tag field that identifies the real address of the memory block held in the corresponding cache line of cache array 502, a state field that indicate the coherency state of the cache line, and an LRU (Least Recently Used) field indicating a replacement order for the cache line with respect to other cache lines in the same congruence class.

L3 cache 232 additionally includes various state machines to service various types of requests and to transfer data into and out of cache array 502. For example, L3 cache 232 includes multiple (e.g., 16) Read (RD) machines 512 for independently and concurrently servicing read (RD) requests received from the affiliated L2 cache 230 via RD channel 240. L3 cache 232 also includes multiple snoop (SN) machines 511 for handling remote memory access requests snooped from local interconnect 114 that originate from caches 230 supporting remote processor cores 200. As is known in the art, the servicing of snooped requests may include, for example, invalidating cache lines in L3 directory 508 and/or sourcing cache lines of data from cache array 502 by cache-to-cache intervention. L3 cache 232 additionally includes multiple cast-in (CI) machines 513 for servicing cast-in (CI) requests received from the affiliated L2 cache 230 via CI channel 242. As will be appreciated, the servicing of cast-in requests by CI machines 513 may require the replacement of memory blocks in cache array 502. Accordingly, L3 cache 230 also includes castout (CO) machines 510 that manage the removal of memory blocks from cache array 502 and, if necessary, the writeback of those memory blocks to system memory 108. Data removed from L3 cache 232 by CO machines 510 and SN machines 511 is buffered in a CPI (castout push intervention) queue 518 prior to transmission to local interconnect 114.

L3 cache 230 further includes an arbiter 505 that orders the processing of CI requests, RD requests and remote memory access requests snooped from local interconnect 114. Such memory access requests are forwarded in accordance with the arbitration policy implemented by arbiter 505 to dispatch logic, such as a dispatch pipeline 506, which processes each memory access request with respect to L3 directory 508 and cache array 502 and, if necessary, dispatches the memory access requests to the appropriate state machines 511, 512 or 513 for processing. If necessary, at a predetermined time during processing of the memory access request within dispatch pipeline 506, arbiter 505 transmits the request address to cache array 502 via address and control path 526 to initiate a cache read of the memory block specified by the request address.

As described further below, L3 cache 232 includes transactional memory (TM) logic 530 that supports execution of memory transactions by the associated processor core 200. TM logic 530 includes TM tracking logic 531 that tracks cache lines in cache array 502 that are within the transaction footprint of a memory transaction under execution by the associated processor core 200 to ensure appropriate handling of such cache lines upon the completion of the memory transaction.

Figure 6:
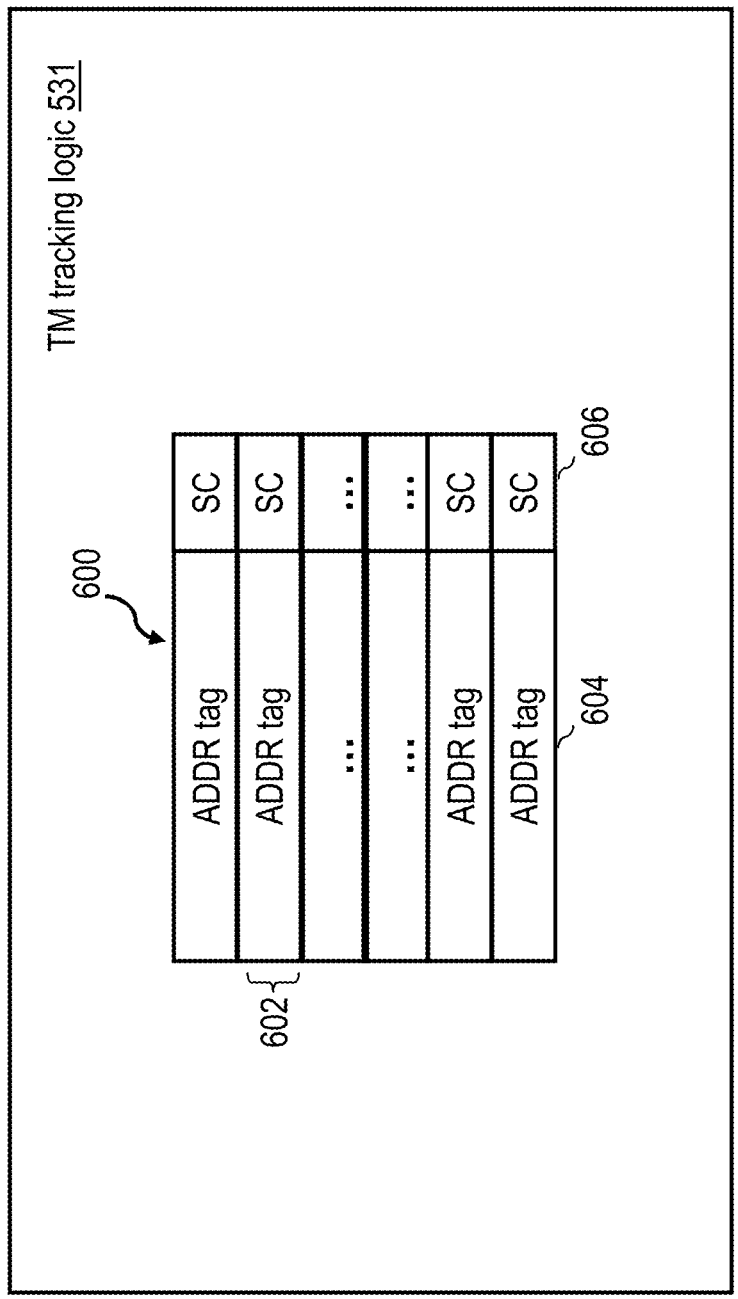
FIG. 6 is a more detailed block diagram of exemplary transactional memory (TM) tracking logic in the L3 cache of FIG. 5 in accordance with one embodiment.

Referring now to FIG. 6, there is depicted a more detailed view of TM tracking logic 531 of L3 cache 232 in accordance with one embodiment. As depicted, TM tracking logic 531 includes a TM directory 600, which in the depicted embodiment contains an equal number of entries 602 for tracking the cache lines within the load and store footprints of memory transactions as the TM directory 400 of the associated L2 cache 230. In the depicted embodiment, each entry 602 within TM directory 600 includes an address tag field 604 and a screen coherency (SC) field 606. Address tag field 604 indicates the real memory address of a cache line held in cache array 502 that is in the footprint of an active memory transaction of the associated processor core 200. SC field 606 indicates whether or not the coherence state indicated from the associated cache line in L3 directory 508 should be made visible or not. In particular, if SC field 606 is not asserted, the coherence state held in L3 directory 508 is utilized for the associated cache line, and if SC field 606 is asserted, the cache line is handled as if invalid in L3 cache 232. In response to an active memory transaction committing or failing, TM tracking logic 531 clears all entries 602 in TM directory 600.

Figure 7:
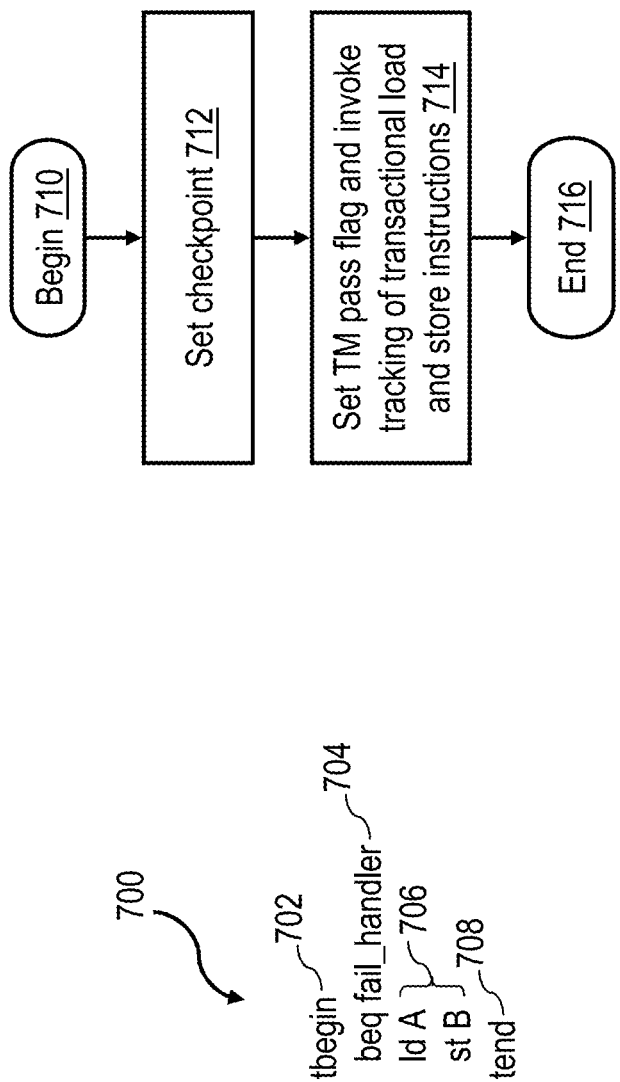
FIG. 7A is an illustrative example of a memory transaction in accordance with one embodiment.
FIG. 7B is a high level logical flowchart of an exemplary method of executing a tbegin instruction that initiates a memory transaction in accordance with one embodiment.

With reference now to FIG. 7A, an illustrative example of a memory transaction is depicted. Those skilled in the art will recognize that the particular semantics and instructions utilized to implement the various memory transactions described herein are but some of the numerous possible implementations and that the disclosed techniques of implementing transactional memory are not dependent on the specific instructions and instruction semantics employed. Illustrative memory transaction 700 includes a tbegin instruction 702 that initiates transactional processing, a transaction body 706 including one or more memory access instructions that are to be performed atomically (and optionally one or more additional unillustrated instructions), and a tend instruction 708 that terminates transactional processing. Memory transaction 700 additionally includes a branch instruction 704 immediately following tbegin instruction 702. When memory transaction 700 first executes, the condition code register in processor core 200 upon which branch instruction 704 depends is initialized to a value that causes the program branch indicated by branch instruction 704 not to be taken and the flow of execution to continue to transaction body 706. As discussed below, in response to failure of memory transaction 700, as determined, for example, prior to or at the processing of the tend instruction 708, the condition code register is set to a different value, and branch instruction 704 causes execution to branch to a fail handler routine.

FIG. 7B shows an exemplary process by a processor core 200 processes a tbegin instruction 702 of a memory transaction 700 in accordance with one embodiment. The exemplary method begins at block 710 and then proceeds to block 712. Block 712 illustrates the processor core 200 taking a checkpoint 210 of the architected register state of processor core 200, which can be utilized to restore the state of processor core 200 in the event memory transaction 700 fails. Further, as illustrated at block 714, the processor core 200 that is executing tbegin instruction 702 causes the TM pass flag 410 to be set in the associated L2 cache 230 to indicate that the processor core 200 is currently executing a memory transaction 700 that has not yet failed. In addition, the processor core 200 also invokes tracking of load and store instructions within the transaction body 706 (referred to herein as "transactional load" and "transactional store" instructions) to ensure they complete in an atomic fashion or that memory transaction 700 fails in the presence of a conflict. Processor core 200 can invoke setting of TM pass flag 410 and tracking of the transactional memory accesses of transaction body 706, for example, by transmitting a TBEGIN request corresponding to tbegin instruction 702 to the affiliated L2 cache 230 for processing by TM logic 380. Thereafter, the processing of the tbegin instruction 702 ends at block 716 of FIG. 7B.

As noted above, tracking of transactional memory access (e.g., load and store) instructions within transaction body 706 to ensure that they complete in an atomic fashion (or that memory transaction 700 fails in the presence of a conflict) is performed by TM tracking logic 381 of L2 cache 230. The transaction footprint includes two portions: the load footprint corresponding to cache lines touched solely by loads within transaction body 706 (e.g., the cache line at address A in exemplary memory transaction 700) and the store footprint corresponding to cache lines touched solely by store instructions or by both load and store instructions in transaction body 706 (e.g., the cache line at address B in exemplary memory transaction 700).

In response to pass/fail indication 384 (or optionally TM killed indication 385) indicating that a conflict has occurred during execution of memory transaction 700, a processor core 200 and its associated cache hierarchy re-establish the architected register state from the checkpoint 210 taken at the execution of tbegin instruction 702, invalidate the tentatively modified cache lines in the store footprint, clear TM directories 400 and 600, set the condition code register of processor core 200 such that branch instruction 704 will be taken, and transfer control to branch instruction 704. In addition, processor core 200 sets a transaction failure cause register (not shown) in processor core 200 to indicate the cause of the memory transaction's failure. The fail handler routine invoked by branch instruction 704 may choose to re-attempt memory transaction 700 or fall back to more conventional locking mechanisms, optionally based on the content of the transaction failure cause register.

During the execution of a memory transaction, the values stored to the distributed shared memory system by transaction body 706 (i.e., those in the store footprint of the memory transaction) are visible only to the thread of the processor core 200 executing the memory transaction. Threads running on other processor cores 200 will not "see" these values until and only if the memory transaction successfully commits.

For a memory transaction to successfully commit, the transactional load and store instructions in transaction body 706 must complete in an atomic fashion (i.e., there must be no conflicts for the cache lines in the memory transaction's load and store footprints) and the effects of the store instructions in transaction body 706 must propagate to all processing units 104 in data processing system 100 and invalidate any cached copies of those cache lines held in other processing units 104. If both of these conditions hold when tend instruction 708 is executed, transactional control logic 382 indicates to processor core 200 via pass/fail indication 384 that memory transaction 700 passed and commits all stores performed in transaction body 706 to L2 cache 230, thus making them visible to all other threads in the system simultaneously.

In the following discussion, a load or store instruction will be called "transactional" if that load or store instruction occurs within the transaction body 706 of a memory transaction 700 and is subject to conditional atomic completion as described above. Similarly, a load or store will be called "non-transactional" if it occurs outside a transaction body 706 or within a suspended region of a transaction body, as described below with reference to FIG. 8. In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, the given memory transaction has a conflict if one of its transactional loads hits an address already extant in the store footprint of another processor core's memory transaction. In a fifth case, the given memory transaction has a conflict if one of its transactional stores hits an address already extant in the store footprint of another processor core's memory transaction. The above conflict policy biases in favor of transactional stores over transactional loads, while allowing transactional and non-transactional loads to freely intermingle. This exemplary conflict policy is but one of several possible embodiments.

Figure 8:
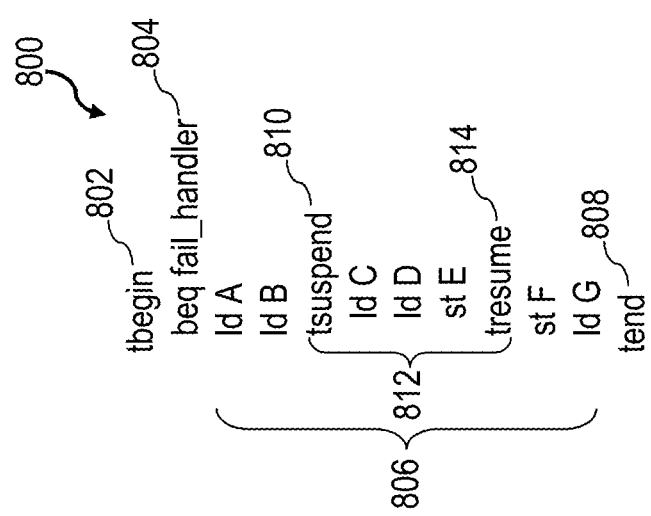
FIG. 8 is an illustrative example of a memory transaction including a suspended region in accordance with one embodiment.

With reference now to FIG. 8, there is illustrated a representative memory transaction 800 containing a suspended region. As can be seen by comparison of FIGS. 7A and 8, memory transaction 800 includes a tbegin instruction 802, branch instruction 804, transaction body 806 and tend instruction 808, which correspond to tbegin instruction 702, branch instruction 704, transaction body 706 and tend instruction 708 described above. In addition, memory transaction 800 includes a tsuspend instruction 810 that initiates the start of a suspended region 812. When a memory transaction is suspended through execution of tsuspend instruction 810, the load and store footprints currently established for the enclosing memory transaction containing suspended region 812 remain in place and continue to be tracked by TM tracking logic 381 and TM tracking logic 531 for conflicts. However, any load or store instructions within suspended region 812 are treated as non-transactional loads and stores and follow existing semantics for such loads and stores. In particular, stores within suspended region 812 are non-transactional and will commit and begin propagating to other processors unconditionally. If a store within suspended region 812 hits either the load or the store footprint of the enclosing memory transaction, a conflict occurs (which also destroys the tentative transactional version of the cache line in the store footprint) and is logged by transactional control logic 382. However, this conflict is not acted on until the enclosing memory transaction is resumed upon execution of tresume instruction 814, at which point the processor core 200 passes control to branch instruction 804 as described. If a non-transactional load instruction within suspended region 812 hits a cache line within the store footprint of the enclosing memory transaction 800, that load instruction returns the tentatively updated value written by a transactional store within the transaction body 806 unless that value has been overwritten by a non-transactional store either by another processor core 200 or by a non-transactional store in suspended region 812, in which case the non-transactional load instruction returns the current value of the target location.

Use of a suspended region 812 allows the temporary suspension of a memory transaction, which permits store instruction(s) in the suspended region 812 to unconditionally update locations in the distributed shared memory system while also allowing for the resumption of the memory transaction at a later time. One possible use for a suspended region 812 is to log debug information into a scratchpad region of the distributed shared memory system and then to resume the enclosing memory transaction. Without a suspended region, the write of the debug information would be rolled back any time the enclosing memory transaction is aborted.

Figure 9A:
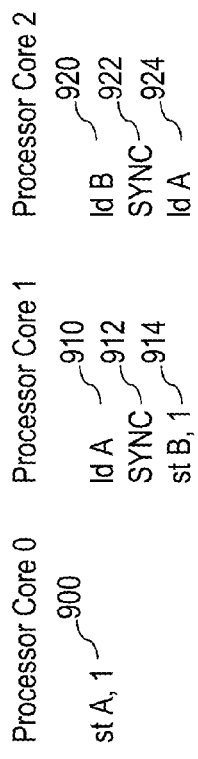
FIG. 9A depicts execution of an exemplary program illustrating causality in a multiprocessor data processing system.

Referring now to FIG. 9A, the execution of an exemplary program illustrating the property of causality in a multiprocessor data processing system is shown. As used herein "causality," which is desirable property in multiprocessor programs, is defined as being preserved if, during execution of a multiprocessor program, a given thread of execution cannot read the effects of a computation before the writes that caused the computation can be read by the given thread.

In the simplified example given in FIG. 9A (as well as those discussed below with reference to FIGS. 9B-6C), a multiprocessor program is executed by three processor cores 200 of data processing system 100, labeled for ease of reference as processor core 0, processor core 1 and processor core 2. In FIG. 9A, processor core 0 executes a store instruction 900 that writes a value of 1 to address A in the distributed shared memory system. This update of address A propagates to processor core 1, and load instruction 910 executed by processor core 1 therefore returns a value of 1. Even though the memory update made by store instruction 900 has propagated to processor core 1, that memory update may not yet have propagated to processor core 2. If store instruction 914 executes on processor 1 and the associated memory update propagates to processor 2 before the memory update of store instruction 900 propagates to processor 2, causality would be violated because the store of the value of 1 to address B, which is an effect of the store to address A, would be visible to processor core 2 before the memory update associated with causal store instruction 900 was visible to processor core 2.

To ensure causality in a weak consistency memory model, barrier instruction 912 (e.g., a SYNC) ensures that store instruction 914 does not take effect or begin propagating its memory update to other processor cores until load instruction 910 has bound to its value. In addition, barrier instruction 912 also ensures that the memory update associated with store instruction 900 propagates to processor 2 before the memory update associated with store instruction 914. Thus, causality is preserved because the cause of the computation (i.e., the memory update of store instruction 900) is visible to processor core 2 before the result of the computation (i.e., the memory update of store 914). A barrier instruction 922 is also executed by processor core 2 to ensure that processor core 2 executes load instructions 920 and 924 and binds their values in order, thus guaranteeing that processor core 2 properly observes the memory updates made by processor core 0 and processor core 1.

Figure 9B:
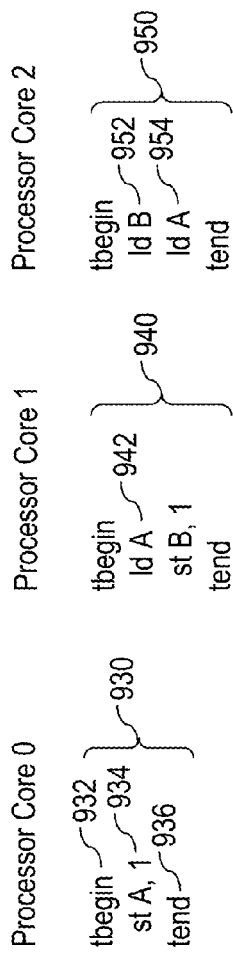
FIG. 9B illustrates execution of an exemplary program including memory transactions to ensure causality.

With reference now to FIG. 9B, an exemplary embodiment of the multiprocessor program of FIG. 9A rendered in terms of memory transactions is illustrated. In FIG. 9B, the branch instructions to the memory transaction fail handler are omitted for clarity.

As illustrated, processor core 0 executes a memory transaction 930 including a tbegin instruction 932, tend instruction 936, and a transaction body including a store instruction 934 that stores a value of 1 to address A. Upon the execution of tend instruction 936, memory transaction 900 successfully commits and makes the update to address A visible to all the other processor cores simultaneously. In particular, by the time load instruction 942 of the memory transaction 940 executing on processor core 1 can read the value of 1 from address A, load instruction 954 of the memory transaction 950 executing on processor core 2 must also be able to read the value of 1 for address A. Memory transaction 940 then reads the value of 1 for address A, stores a value of 1 to address B and successfully commits. Finally, load instruction 952 of memory transaction 950 reads a value of 1 for address B, and given that memory transaction 940 read a value of 1 for A, load instruction 954 must also read a value of 1 for address A.

In order to make the memory updates of store instructions in a successful transaction visible to all other processor cores simultaneously, before that memory transaction can commit all the cache line invalidates necessitated by the memory transaction must have propagated through the data processing system such that any other processor cores' now stale copies of the updated cache lines have been removed (e.g., invalidated) and can no longer be read by the other processor cores. Without this requirement, a processor core could still read a stale value for an updated memory location after the memory transaction that updated the memory location committed. A processor core, therefore, needs to ensure that the memory updates associated with its own transactional stores are fully propagated through the data processing system to invalidate any stale cached copies before committing a successful memory transaction in order to maintain the semantics of memory transactions. As a consequence of the propagation of the memory updates inherent in the semantics of memory transactions, causality is trivially preserved when only memory transactions are utilized to access memory locations in a distributed shared memory system. However, when transactional and non-transactional code interact on the same shared variables, causality is not directly preserved by ensuring that the memory updates made by a memory transaction are visible simultaneously to all other processor cores.

Figure 9C:
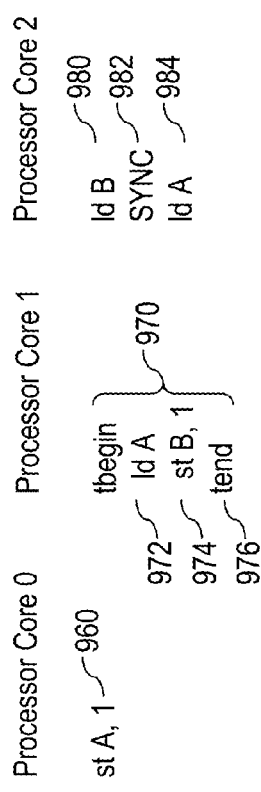
FIG. 9C depicts execution of an exemplary program including both transactional and non-transactional memory accesses.

Referring now to FIG. 9C, an illustrative multiprocessor program is depicted that includes a mixture of transactional and non-transactional accesses to a distributed shared memory system. In FIG. 9C, the branch instructions to the memory transaction fail handler are again omitted for clarity.

In the exemplary multiprocessor program, processor core 0 executes a non-transactional store instruction 960 that unconditionally writes a value of 1 to address A in the distributed shared memory system. This value propagates to processor core 1 and is read by transactional load instruction 972 within the memory transaction 970 executed by processor core 1. Processor core 1 then executes a store instruction 974 within memory transaction 970 that updates the cache line associated with address B and completes invalidating any stale cached copies of the cache line associated with address B (so that no other processor core holds a copy of the now stale cache line) and successfully commits memory transaction 970 upon execution of tend instruction 976. Processor core 2 then executes load instructions 980 and 984 to read, in order, the cache lines associated with addresses B and A, respectively, based on the ordering enforced by barrier instruction 982. If transaction 970 only ensures that its own memory updates are fully propagated through the distributed shared memory system before committing, the memory update of store instruction 960 may or may not have propagated to processor core 2. Therefore, in at least some operating scenarios, processor core 2 could read a value of 1 for the cache line associated with address B and the, now stale, initial value of 0 for the cache line associated with address A, thus violating causality. The same result would be obtained if processor core 2 utilized transactional loads to read from addresses A and B, as depicted for processor 2 in FIG. 9B.

To guarantee causality, memory transaction 970 must ensure not only that its own transactional stores are propagated throughout the entire distributed shared memory system, but also that any non-transactional store that is read by a transactional load within the transaction has also propagated throughout the distributed shared memory system. (Memory updates of transactional writes that are read by the memory transaction are guaranteed to have propagated throughout the distributed shared memory system because those memory updates could not be read by transaction 970 before they were visible to the entire distributed shared memory system). To ensure that the memory updates of non-transactional stores read by memory transaction 970 are also propagated throughout the distributed shared memory system, the processing of the tend instruction 976 of memory transaction 970 must not allow commitment of memory transaction 970 until the memory update of any non-transactional store read by memory transaction 970 is propagated throughout the distributed shared memory system.

Figure 10:
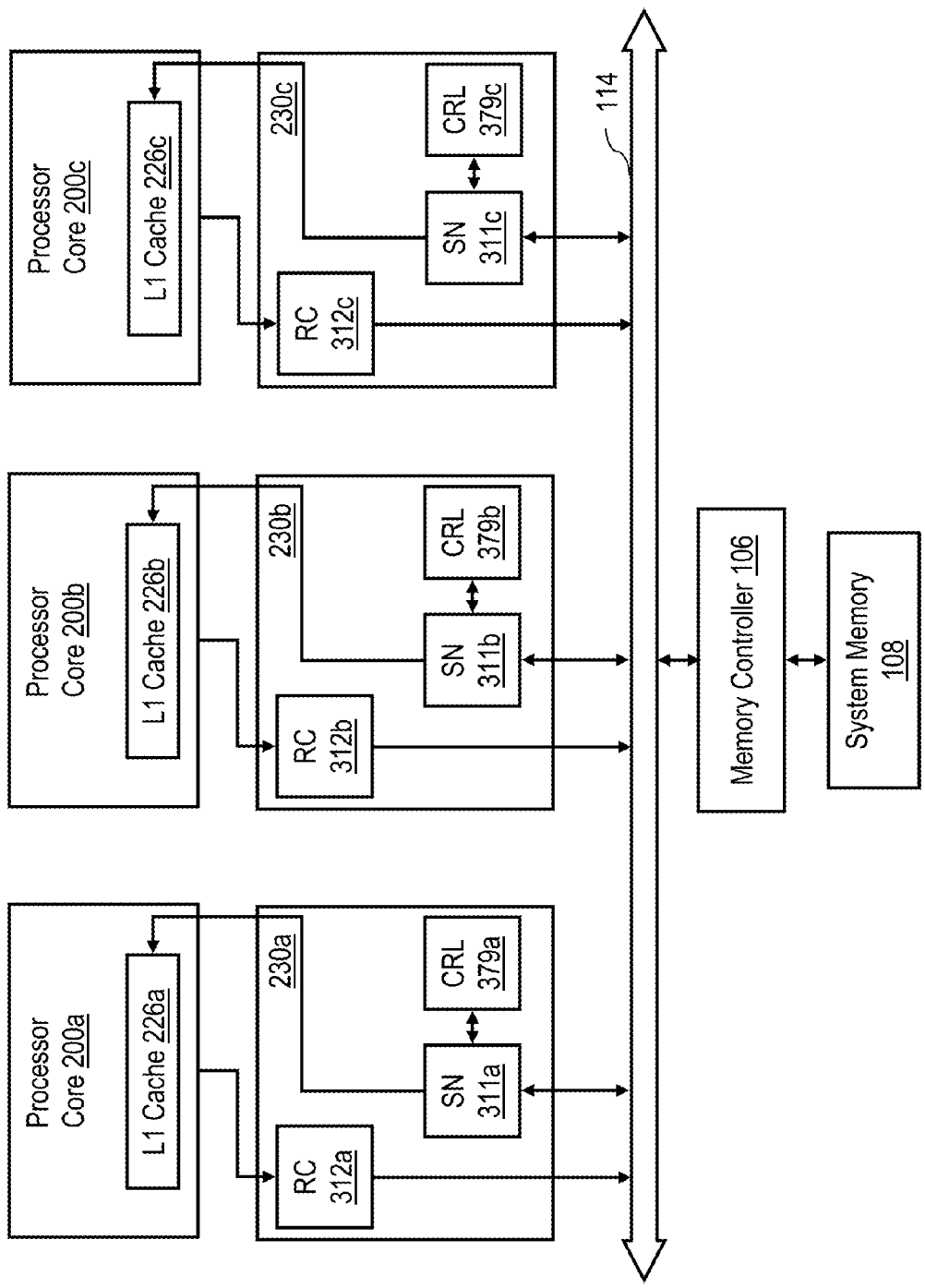
FIG. 10 illustrates a view of selected components of a multiprocessor data processing system that executes the exemplary program of FIG. 9C.

With reference now to FIG. 10, there is illustrated a partial view of data processing system 100 of FIG. 1, which executes the multiprocessor program of FIG. 9C. In the view given in FIG. 10, processor cores 200a, 200b and 200c respectively correspond to processor cores 0, 1 and 2 of FIG. 9C. Further, an instance of causality resolution logic 379 is instantiated for and coupled to each instance of snooper 311, for example, as a component of the L2 cache 230 affiliated with each processor core 200. L3 caches 232 are omitted from illustrated in FIG. 10 for simplicity.

Initially, processor core 200c holds a cached copy of the initial value (e.g., 0) of memory location A in its L1 cache 226c. Processor 200a begins execution of the multiprocessor program of FIG. 9C by executing store instruction 960. In response to execution of store instruction 960, processor core 200a transmits a store request to its L2 cache 230a, which allocates an RC machine 312 to service the store request. RC machine 312 broadcasts the store request onto local interconnect 114, and snoop machine 311c of the L2 cache 230c affiliated with processor core 200c registers the store request, including the processing unit that sourced the store request (i.e., the processing unit including processor core 200a). At this point, the memory update of store instruction 960 has not propagated to processor core 200c, but is instead queued for later processing, advantageously allowing processor core 200a to continue executing further instructions before the memory update of store instruction 960 is fully propagated.

Processor core 200b then executes load instruction 972 and, finding no copy of the target cache line associated with address A in its L1 cache 226b, transmits a read request to its L2 cache 230b. In response to the read request, L2 cache 230b allocates RC machine 312b to service the read request. In response to a miss of the read request in L2 cache 230b, RC machine 312b issues a read request onto local interconnect 114 to obtain the current value for address A. L2 cache 230a responds to the read request and provides the current value of address A to processor core 200b by cache-to-cache intervention. At this point a so-called "causality passing read" has occurred, that is, load instruction 972 has read the value of a store instruction that has not fully propagated through the entire distributed shared memory system. To account for this fact and to protect causality, causality resolution logic 379c in L2 cache 230c notes the successful read intervention between the vertical cache hierarchies of processor cores 200a and 200b for an address that is currently being invalidated by snoop machine 311c. In this manner causality resolution logic 379c directly tracks the causal dependency that processor 200b and its vertical cache hierarchy has on the memory update of store instruction 960 completing its propagation.

Processor 200b executes store instruction 974, which specifies an update of the value of address B to 1. In response to execution of store instruction 974, RC machine 312b issues a store request corresponding to store instruction 974 on local interconnect 114. In absence of an existing cached copy of the target cache line, memory controller 106 supplies the current value of address B from system memory 108 in response to the store request, and RC machine 312b updates L2 cache 230b accordingly. At this point processor core 1 executes tend instruction 976 to attempt to successfully commit transaction 970 and places a corresponding TEND request on local interconnect 114 to ensure that all prior memory updates by transactional stores in memory transaction 970 have been propagated throughout the distributed shared memory system and that any memory updates by non-transactional stores read by memory transaction 970 have similarly propagated throughout the distributed shared memory system. In this case, the memory update of store instruction 974 has fully propagated throughout the distributed shared memory system because no other caches held a copy of the cache line associated with address B. However, had any such copy existed and had the memory update not been fully complete, a snoop machine 311 in those caches, which noted the initial processor core 200 issuing the store, would be active and would provide a retry response to the snooped TEND request from that processor core 200 (forcing the TEND request to be reissued) until the invalidation of the cached copy of the cache line completes.

In the case at hand, the TEND request is not from the processor core 200 that initiated the store request, and therefore snoop machine 311c will not provide a retry response to the TEND request. However, causality resolution logic 379c has a causal dependency for processor 200b and its vertical cache hierarchy and issues on local interconnect 114 a retry response to the TEND request because the TEND request was issued from a processor core 200 that was the recipient of a causality passing read of the same address that snoop machine 311c is processing. In this manner, causality resolution logic 379 directly tracks which processor cores 200 have a causality dependency due to reading a memory update of a non-transactional store that was not fully completed for the processor core with which causality resolution logic 379 is associated.

It should be noted that, in general, causality resolution logic 379 must maintain a list capable of representing all the processors cores 200 in the data processing system to provide causality in cases in which the causality dependency chain passes through more than one processor core (e.g., a test where a first processor stores a location, a second processor reads that location and then stores a first flag variable, a third processor loads the first flag variable and writes a second flag in a transaction, and then a final thread reads the second flag and then the initial location). In such an implementation, a TEND request issued from any processor core with a causal dependency on the target address being invalidated by the snoop machine 311 associated with the instance of causality resolution logic 379 is retried. In a large SMP, however, such an embodiment can be prohibitive in cost and many implementations of causality resolution logic 379 only precisely track causal dependency chains of a certain fixed depth (e.g., two or three processors) and in the presence of longer dependency chains resort to pessimistically retrying all TEND requests until the cache line invalidations necessitated by the store instruction have completed processing.

To summarize, causality resolution logic is utilized to detect the occurrence of causal dependency chains, to a depth determined by the embodiment, on a pending store that has not completed processing throughout the entire distributed shared memory system. These causal dependencies are utilized to stall the completion of TEND requests from those processor cores with a causal dependency on the incomplete (pending) stores. In this manner, the memory transaction cannot complete (and therefore make its own stores visible), until the stores the memory transaction has read (i.e., those in the causal dependency chain of the memory transaction) have first completed throughout the distributed shared memory system. Only after these stores in the memory transaction's causal dependency chain (and the transactional stores of the memory transaction itself, though this is guaranteed by snooper 311 instead of causality resolution logic 379) have completed, may the TEND request complete, leading to the memory transaction successfully committing if no conflicts have occurred during its execution.

In other embodiments, additional causality resolution logic may be required to ensure the causality of memory operations. For example, in an implementation that contains a write-through L1 cache shared by a multithreaded processor core followed by a shared L2 store queue, it is possible for different threads (i.e., logically different processor cores from the point of view of software) to read stored values from the L1 cache before these stores have even propagated to the L2 cache, much less to the entire distributed shared memory system. In such an implementation, the tend instruction must act as a barrier for transactional stores in the given thread. This behavior ensures that the transactional stores are propagated to the system interconnect and the necessary snoop machines 311 so that the tend instruction can ensure, when trying to complete the memory transaction, that all of the cache line invalidations required by the memory transaction's stores have fully propagated. In addition, the tend instruction must act as a barrier for non-transactional stores that have been (or may have been) read by transactional loads within the transaction. In the simplest (and most common embodiment), all non-transactional stores within the shared store queue are treated as if they have come from a single thread for purposes of retrying the TEND request.

In this manner, all non-transactional stores from which any transaction has (or may have) read that have not been fully propagated are broadcast to snoop machines 311 as necessary before a TEND request for any transaction from that multithreaded processor core is presented on local interconnect 114. In such an embodiment, snoop machines 311 treat all stores coming from a given multithreaded processor core in a unified manner and will retry any TEND request, as necessary, from that given multithreaded processor core regardless of thread. In this embodiment, causality resolution logic 379 is not involved in monitoring these intra-core dependencies, but instead is utilized solely to manage causality dependencies between multithreaded processor cores.

The exact placement and details of the necessary causality resolution logic will vary with the particulars of given embodiment and will be apparent to those skilled in the art given the teachings herein. In general, at any point where a load may return the value of a store that has not fully propagated throughout the entire distributed shared memory system, if causality is to be preserved a mechanism must be provided to ensure that any store with a causal dependency to a different processor core is noted and that causal dependency delays the processing of a tend instruction (or other semantic) ending a memory transaction until such time as the stores in the causal dependency chain of the memory transaction have completed propagating.

In some prior art designs supporting memory transactions, when a transactional store request hits a target cache line containing data that was modified with respect to system memory ("dirty") prior to the memory transaction, a copy of the target cache line is pushed to system memory prior to being updated by the transactional store request in order to preserve the prior version of the target cache line in case the memory transaction ultimately fails and therefore does not succeed in updating the target cache line. In many cases, creation of backup copies of target cache lines of transactional store requests in system memory in this manner results in sub-optimal performance for memory transactions. As a side effect, the increase in the overall duration of the memory transaction due to high latency of writing backup copies of target cache lines of transactional store requests to system memory can also increase the likelihood that the memory transaction will experience a conflict and fail. In accordance with one aspect of the invention disclosed herein, memory transaction performance is increased and latency-induced failures of memory transactions are reduced through the use of a lower level cache (e.g., L3 cache 232) as a backing store for backup copies of modified cache lines that are resident in a processor core's local cache hierarchy and that are targets of transactional store requests, as now described in detail with reference to FIGS. 11-18. To avoid obscuring the inventions disclosed herein, the following discussion describes an embodiment in which all tracking of memory transactions is performed by L2 caches 230 and L3 caches 232, and L1 caches 226 consequently do not cache lines accessed by transactional memory access instructions. In alternative embodiments, such as that described in U.S. patent application Ser. No. 14/278,005, which is incorporated herein by reference, this restriction is not imposed.

Figure 11:
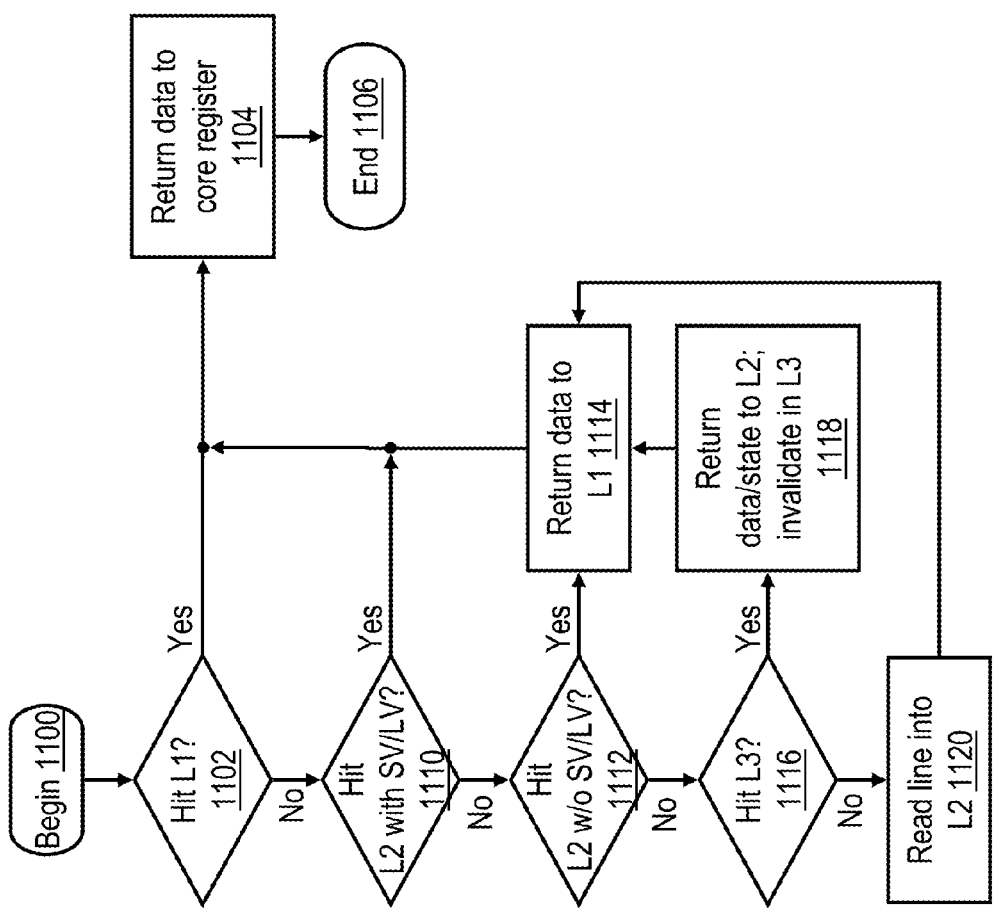
FIG. 11 is a high level logical flowchart of an exemplary method of processing a non-transactional load request in a cache hierarchy supporting transactional memory.

With reference now to FIG. 11, there is illustrated a high level logical flowchart of an exemplary method of processing a non-transactional load request in a cache hierarchy supporting memory transactions, in accordance with one embodiment. The process begins at block 1100, for example, in response to receipt at an L2 cache 230 of a non-transactional load request generated by the associated processor core 200, for example, by execution of a non-transactional load instruction either preceding or following a memory transaction or within a suspended region 812 of a memory transaction 800. The process proceeds from block 1100 to block 1102, which illustrates a determination regarding whether or not the target real address of the non-transactional load request hits in the L1 cache 226 of the processor core 200. In response to a determination at block 1102 that the target address of the non-transactional load request hits in the L1 cache 226 of the processor core 200, the requested data is returned to the processor core 200 for storage in a register file 208 (block 1104). In this particular case, the data is returned from L1 cache 226. Following block 1104, the process of FIG. 11 thereafter ends at block 1106.

Returning to block 1102, in response to a determination that the target address of the non-transactional load request missed in the L1 cache 226 of the processor core 200, the processor core 200 forwards the non-transactional load request to its associated L2 cache 230, and the process of FIG. 11 passes to block 1110. At block 1110, L2 cache 230 determines whether or not the target real address of the non-transactional load request hits in the transaction footprint of an active memory transaction of the associated processor core 200, as indicated by TM directory 400 of TM tracking logic 381. If not, the process proceeds to block 1112, which is described below. If, however, L2 cache 230 determines that the target real address of the non-transactional load request hits in the transaction footprint of an active memory transaction of the associated processor core 200, the process proceeds from block 1110 to block 1104, which represents an RC machine 312 causing the data requested by the non-transactional load request to be returned to processor core 200 for storage in a register file 208. Thereafter, the process of FIG. 11 ends at block 1106.

Returning to block 1112, L2 cache 230 determines whether or not the target real address of the non-transactional load request hits in L2 directory 308, but does not hit the transaction footprint of an active memory transaction, if any, of the associated processor core 200. If not, the process proceeds to block 1116, which is described below. If, however, L2 cache 230 determines that the target real address of the non-transactional load request hits in L2 directory 308, but does not hit the transaction footprint of an active memory transaction, if any, of the associated processor core 200, the process proceeds from block 1112 to block 1114, which represents an RC machine 312 of L2 cache 230 causing the cache line identified by the target real address of the non-transactional load request to be returned to processor core 200 for storage in L1 cache 226. In addition, the data requested by the non-transactional load request is loaded into a register file 208 (block 1104). Thereafter, the process of FIG. 11 ends at block 1106.

Referring again to block 1116, in response to the target real address of the non-transactional memory access request missing in L2 cache 230, L2 cache 230 forwards a RD request to L3 cache 232, and L3 cache 232 accordingly determines whether or not the target real address of the RD request hits in L3 directory 508. If so, a RD machine 512 of L3 cache 232 causes the target cache line and associated coherence state to be returned from L3 cache 232 to the associated L2 cache 230 and invalidates the target cache line in L3 directory 508 (block 1118). Thereafter, the process passes to blocks 1114, 1104 and 1106, which have been described. Returning to block 1116, in response to a determination that the target real address of the non-transactional load request misses in L3 directory 508 (as signaled to L2 cache 230 via RD channel 240), L2 cache 230 obtains a copy of the target cache line via cache-to-cache intervention or from the system memory 108 of the target cache line (block 1120). Thereafter, the process passes to block 1114 and following blocks, which have been described.

Figure 12:
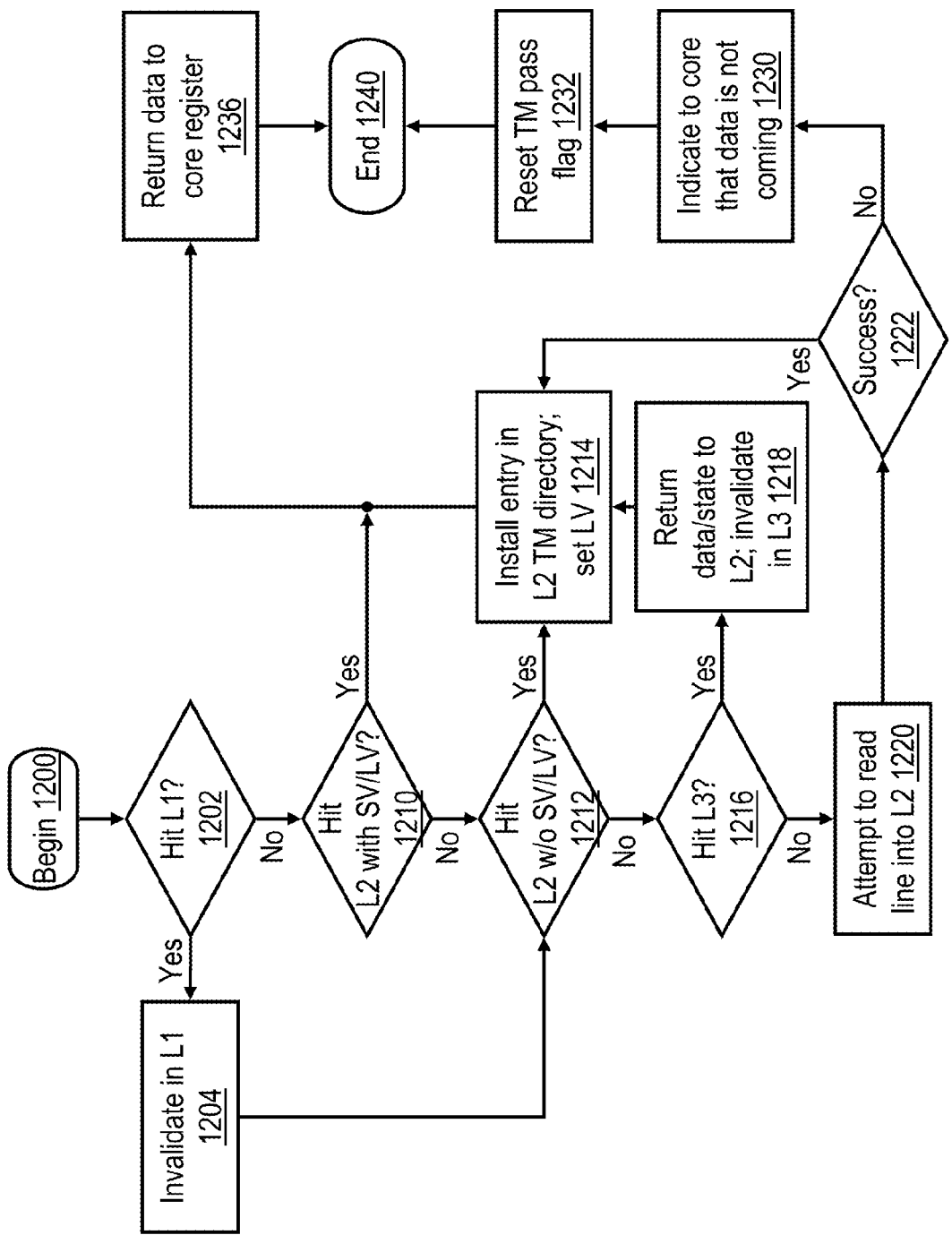
FIG. 12 is a high level logical flowchart of an exemplary method of processing a transactional load request in a cache hierarchy supporting transactional memory.

Referring now to FIG. 12, there is depicted a high level logical flowchart of an exemplary method of processing a transactional load request in a cache hierarchy supporting transactional memory, in accordance with one embodiment. The process begins at block 1200, for example, in response to receipt at an L2 cache 230 of a transactional load request generated by the associated processor core 200, for example, by execution of a transactional load instruction within the transaction body 706, 806 of a memory transaction 700, 800. The process proceeds from block 1200 to block 1202, which illustrates a determination regarding whether or not the target real address of the transactional load request hits in the L1 cache 226 of the processor core 200. In response to a determination at block 1202 that the target address of the transactional load request hits in the L1 cache 226 of the processor core 200, the corresponding data is invalidated in L1 cache 226 (block 1204). Following block 1204, the process of FIG. 12 passes to block 1212, which is described below. It should be noted that the target real address hitting in L1 cache 226 inherently indicates that the target real address has not previously formed part of the transaction footprint of the memory transaction.

Returning to block 1202, in response to a determination that the target address of the transactional load request misses in the L1 cache 226 of the processor core 200, the processor core 200 forwards the transactional load request to its associated L2 cache 230, and the process of FIG. 12 passes to block 1210. At block 1210, L2 cache 230 determines whether or not the target real address of the transactional load request hits in the transaction footprint of an active memory transaction of the associated processor core 200, as indicated by TM directory 400 of TM tracking logic 381. If not, the process proceeds to block 1212, which is described below. If, however, L2 cache 230 determines that the target real address of the transactional load request hits in the transaction footprint of the active memory transaction of the associated processor core 200, the process proceeds from block 1210 to block 1236, which represents an RC machine 312 of L2 cache 230 causing the data requested by the transactional load request to be returned to processor core 200 for storage in a register file 208. Thereafter, the process of FIG. 12 ends at block 1240.

Returning to block 1212, L2 cache 230 determines whether or not the target real address of the transactional load request hits in L2 directory 308, but does not hit the transaction footprint of the active memory transaction of the associated processor core 200. If not, the process proceeds to block 1216, which is described below. If, however, L2 cache 230 determines that the target real address of the transactional load request hits in L2 directory 308, but does not hit the transaction footprint of the active memory transaction of the associated processor core 200, the process proceeds from block 1212 to block 1214, which represents TM tracking logic 381 of L2 cache 230 installing an entry 402 for the target real address in TM directory 400 and setting the associated LV field 408 to indicate that the target real address is within the load footprint of the active memory transaction. The process then proceeds to blocks 1236 and 1240, which have been described.

Referring again to block 1216, in response to the target real address of the transactional load request missing in L2 cache 230, L2 cache 230 forwards a RD request to L3 cache 232 via RD channel 240, and L3 cache 232 accordingly determines whether or not the target real address of the RD request hits in L3 directory 508. If so, a RD machine 512 of L3 cache 232 causes the target cache line and associated coherence state to be returned from L3 cache 232 to the associated L2 cache 230 and invalidates the target cache line in L3 directory 508 (block 1218). Thereafter, the process passes to blocks 1214, 1236 and 1240, which have been described. Returning to block 1216, in response to a determination that the target real address of the transactional load request misses in L3 directory 508 (as indicated to L2 cache 230 via RD channel 240), an RC machine 312 of L2 cache 230 attempts to obtain a copy of the target cache line via cache-to-cache intervention or from the system memory 108 of the target cache line (block 1220). In response to a determination at block 1222 that the attempt to obtain a copy of the target cache line was successful, the process proceeds from block 1222 to block 1214, which has been described. If, however, L2 cache 230 determines at block 1222 that the attempt to obtain a copy of the target cache line was unsuccessful, for example, based on the selected conflict resolution policy, the process proceeds to block 1230. Block 1230 illustrates transactional control logic 382 indicating to processor core 200 that the requested data from the target cache line will not be provided, for example, by asserting TM killed indication 385 or via an alternative indication. Transactional control logic 382 also resets TM pass flag 410 to indicate that the memory transaction has failed (block 1232). Thereafter the process of FIG. 12 ends at block 1240.

It should be noted that the foregoing flowchart assumes that, if needed, an entry 402 in TM directory 400 is always available to allocate to track each transactional memory access of a memory transaction undergoing execution. If this turns out not to be the case, then TM logic 380 preferably takes appropriate actions to fail the memory transaction.

Figure 13:
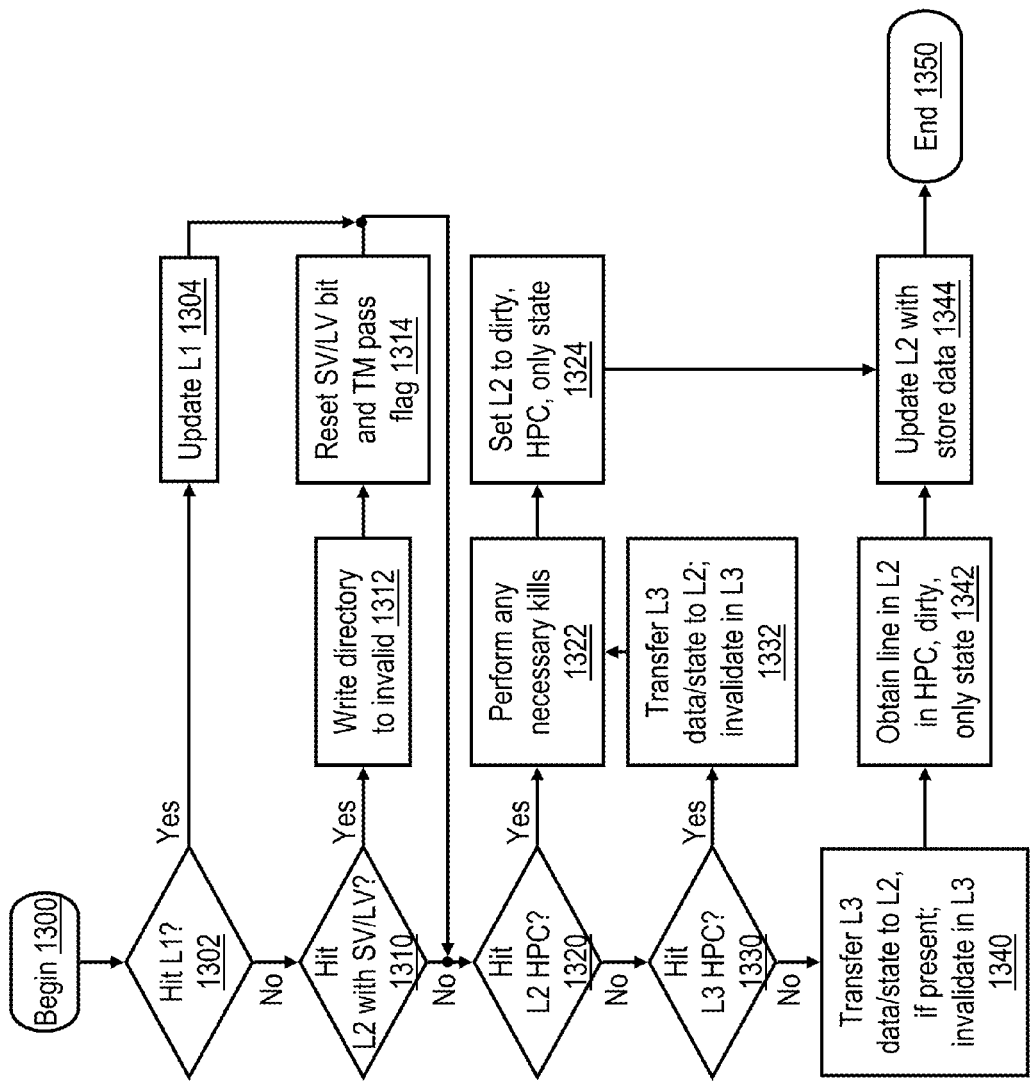
FIG. 13 is a high level logical flowchart of an exemplary method of processing a non-transactional store request in a cache hierarchy supporting transactional memory.

With reference now to FIG. 13, there is illustrated a high level logical flowchart of an exemplary method of processing a non-transactional store request in a cache hierarchy supporting transactional memory. The process begins at block 1300, for example, in response to receipt at an L2 cache 230 of a non-transactional store request generated by the associated processor core 200, for example, by execution of a non-transactional store instruction either preceding or following a memory transaction or within a suspended region 812 of a memory transaction 800. The process proceeds from block 1300 to block 1302, which illustrates a determination regarding whether or not the target real address of the store request hits in the L1 cache 226 of the processor core 200. In response to a determination at block 1302 that the target address of the non-transactional store request hits in the L1 cache 226 of the processor core 200, the processor core 200 updates the store-through L1 cache 226 with the store data (block 1304). Following block 1304, the process of FIG. 13 passes to block 1320, which is described below. It should be noted that the target real address hitting in L1 cache 226 inherently indicates that the target real address does not form part of the transaction footprint of any active memory transaction of processor core 200.

Returning to block 1302, in response to a determination that the target address of the non-transactional store request misses in the L1 cache 226 of the processor core 200, the processor core 200 forwards the non-transactional store request to its associated L2 cache 230, and the process of FIG. 13 passes to block 1310. At block 1310, L2 cache 230 determines whether or not the target real address of the non-transactional store request hits in the transaction footprint of an active memory transaction of the associated processor core 200, as indicated by TM directory 400 of TM tracking logic 381. This can occur, for example, if the non-transactional store request was generated by the execution of a store instruction in a suspended region 812. If not, the process proceeds to block 1320, which is described below. If, however, L2 cache 230 determines that the target real address of the non-transactional store request hits in (i.e., conflicts with) the transaction footprint of an active memory transaction of the associated processor core 200, the process proceeds from block 1310 to block 1312, which represents an RC machine 312 of L2 cache 230 invalidating the target cache line in L2 directory 308. TM tracking logic 381 of L2 cache 230 additionally resets the SV field 406 or LV field 408 that is set for the target real address in TM directory 400 and resets TM pass flag 410 to indicate that the memory transaction has failed (block 1314). In response to TM pass flag 410 being reset, transactional control logic 382 sends a TM killed indication to the processor core 200. The process then proceeds from block 1314 to block 1320.

Following block 1310 or blocks 1312-1314, L2 cache 230 determines at block 1320 whether or not the target real address of the non-transactional store request hits in L2 directory 308 in a highest point of coherency (HPC) coherence state indicating that L2 cache 230 has the authority to modify the target cache line without seeking permission via coherency signaling on the system fabric. If not (as would be the case if the coherence state was set to invalid at block 1312), the process proceeds to block 1330, which is described below. If, however, L2 cache 230 determines at block 1320 that the target real address of the non-transactional store request hits in L2 directory 308 in a HPC coherence state, the process proceeds to block 1322. Block 1322 illustrates an RC machine 312 of L2 cache 320 issuing on the system fabric any kill operations needed to invalidate any other cached copy or copies of the target cache line that may reside in data processing system 100. When the kill operations, if any, are complete, the RC machine 312 can then update the coherence state for the target cache line in L2 directory 308 to indicate that the target cache line is dirty (i.e., modified with respect to system memory 108), HPC, and is the only cached copy of the target cache line (block 1324). The RC machine 312 additionally updates cache array 302 with the store data of the non-transactional store request (block 1344). Thereafter, the process of FIG. 13 ends at block 1350.

Referring now to block 1330, in response to the target real address of the non-transactional store request missing in L2 cache 230, an RC machine 312 of L2 cache 230 forwards a RD request 522 to L3 cache 232, and L3 cache 232 accordingly determines whether or not the target real address of the RD request 522 hits in L3 directory 508 in a HPC coherence state. If so, a RD machine 512 of L3 cache 232 causes the target cache line and associated coherence state in L3 directory 508 to be returned from L3 cache 232 to the associated L2 cache 230 and invalidates the target cache line in L3 directory 508 (block 1332). Thereafter, the process passes to block 1322 and following blocks, which have been described. Returning to block 1330, in response to a determination that the target real address of the non-transactional store request did not hit in L3 directory 508 in an HPC coherence state, a RD machine 512 of L3 cache 232 causes the target cache line and associated coherence state in L3 directory 508 to be returned from L3 cache 232 to the associated L2 cache 230 (if present in L3 cache 232) and, if recorded in L3 directory 508, invalidates the target cache line in L3 directory 508 (block 1340). The RC machine 312 of L2 cache 230 then obtains a copy of the target cache line in a coherence state indicating that the L2 cache 230 is the HPC, the target cache line is dirty, and the target cache line is the only cached copy of the target cache line (block 1342). Block 1342 may entail the RC machine 312 initiating one or more operations on the system fabric. Thereafter, the process of FIG. 13 proceeds to blocks 1344 and 1350, which have been described.

Figure 14A:
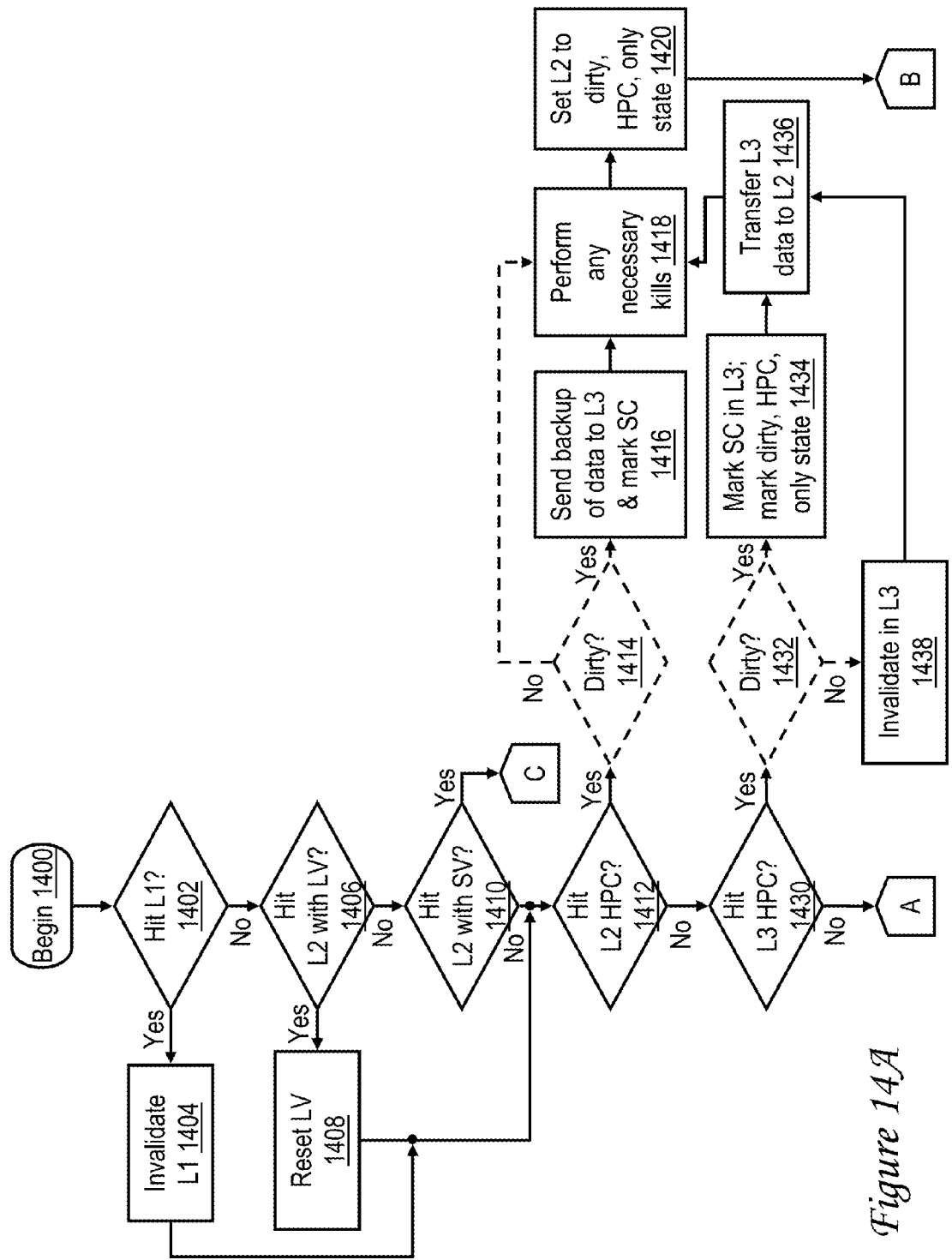
FIGS. 14A-14B together form a high level logical flowchart of an exemplary method of processing a transactional store request in a cache hierarchy supporting transactional memory.
Figure 14B:
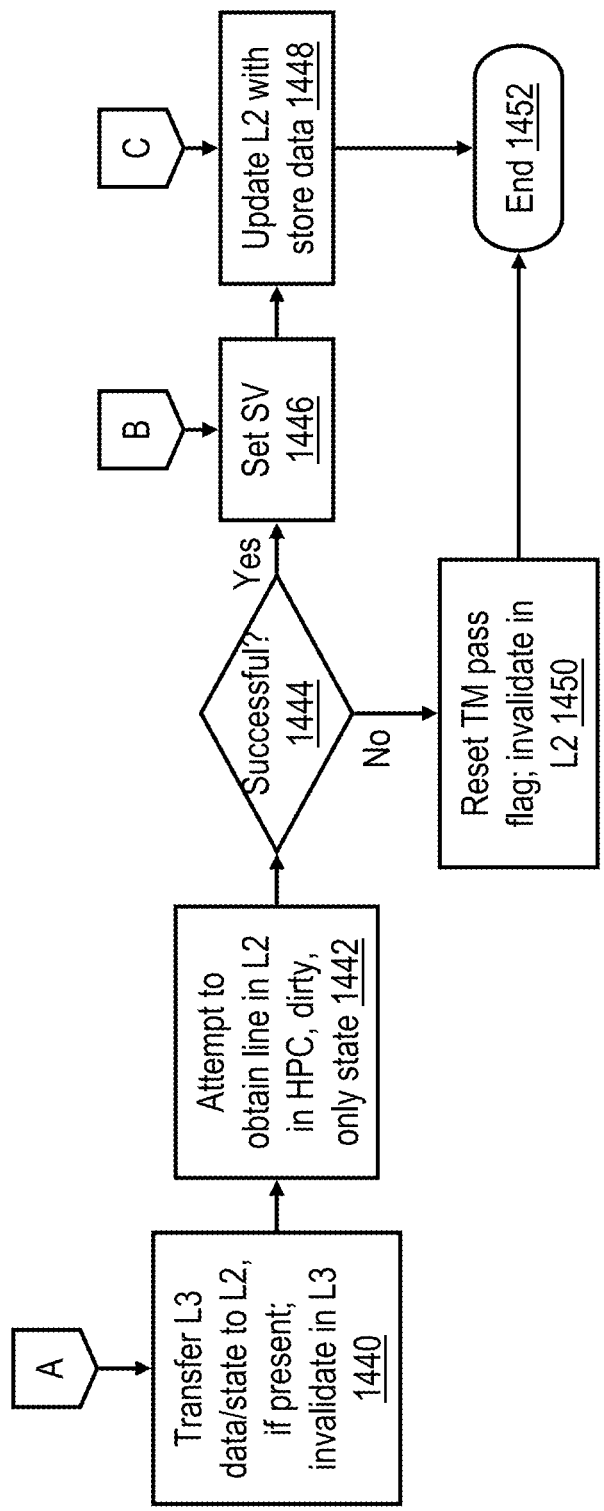

Referring now to FIGS. 14A-14B, there is depicted a high level logical flowchart of an exemplary method of processing a transactional store request in a cache hierarchy supporting transactional memory. The process begins at block 1400, for example, in response to receipt at an L2 cache 230 of a transactional store request generated by the associated processor core 200, for example, by execution of a transactional store instruction within the transaction body 706, 806 of a memory transaction 700, 800. The process proceeds from block 1400 to block 1402, which illustrates a determination regarding whether or not the target real address of the store request hits in the L1 cache 226 of the processor core 200. In response to a determination at block 1402 that the target address of the transactional store request hits in the L1 cache 226 of the processor core 200, the processor core 200 invalidates the target cache line in L1 cache 226 (block 1404). Following block 1404, the process of FIG. 14A passes to block 1412, which is described below. It should again be noted that the target real address hitting in L1 cache 226 inherently indicates that the target real address has not previously formed a part of the transaction footprint of the active memory transaction of processor core 200.

Returning to block 1402, in response to a determination that the target address of the transactional store request missed in the L1 cache 226 of the processor core 200, the processor core 200 forwards the transactional store request to its associated L2 cache 230, and the process of FIG. 14A passes to block 1406. At block 1406, L2 cache 230 determines whether or not the target real address of the transactional store request hits in only the load footprint of the active memory transaction, as indicated by LV field 408 associated with the target real address being set in TM directory 400 of TM tracking logic 381. If so, L2 cache 230 resets the LV field 408 of the target real address in TM directory 400 (block 1408), and the process passes to block 1412, which is described below. If, however, L2 cache 230 determines at block 1406 that the target real address of the transactional store request does not hit in the load footprint of the active memory transaction, L2 cache 230 additionally determines at block 1410 if the target real address of the transactional store request hits in the store footprint of the active memory transaction, as indicated by an SV field 406 associated with the target real address being set in TM directory 400 of TM tracking logic 381. If so, the process proceeds through page connector C to block 1448 of FIG. 14B, which is described below. If not, the process proceeds to block 1412, which depicts a determination if the target real address hits in L2 directory 308 in a HPC coherence state. If not, the process proceeds to block 1430, which is described below. If, on the other hand, the target real address hits in L2 directory 308 in a HPC coherence state, meaning that L2 cache 230 is certain to be able to update the target cache line with the store data of the transactional store request, the process passes to either optional block 1414 or directly to block 1416.

At optional block 1414, an RC machine 312 of L2 cache 230 determines if the coherence state associated with the target real address in L2 directory 308 indicates the target cache line is dirty. If not, meaning a backup copy of the target cacheline already resides in system memory 108, the process passes to block 1418, which is described below. If, however, the RC machine 312 determines at block 1414 that the target cache line is marked as dirty in L2 directory 308 or if block 1414 is omitted, RC machine 312 causes a backup copy of the unaltered (but possibly dirty) target cache line to be sent to L3 cache 232 for storage in cache array 502 (block 1416). As also shown in block 1416, L3 cache 232 additionally asserts the SC field 606 associated with the backup copy of target cache line to ensure the backup copy of the target cache line is not made visible to remote processor cores 200. Block 1418 illustrates an RC machine 312 of L2 cache 320 issuing on the system fabric any kill operations needed to invalidate any other cached copy or copies of the target cache line besides the backup copy held in the associated L3 cache 232 (if present) and the copy presently held in L2 cache 230. When the kill operations, if any, are complete, the RC machine 312 can then update the coherence state for the target cache line in L2 directory 308 to indicate that the target cache line is dirty (i.e., modified with respect to system memory 108), HPC, and is the only cached copy of the target cache line (block 1420). Thereafter the passes through page connector B to block 1446 of FIG. 14B, which is described below.

Referring now to block 1430, in response to the target real address of the transactional store request missing in L2 cache 230, an RC machine 312 of L2 cache 230 forwards a RD request 522 to L3 cache 232, and L3 cache 232 accordingly determines whether or not the target real address of the RD request 522 hits in L3 directory 508 in a HPC coherence state. If not, the process proceeds through page connector A to block 1440 of FIG. 14B, which is described below. If, on the other hand, a determination is made at block 1430 that the target real address hits in L3 directory 508 in a HPC coherence state, the process passes to optional block 1432. At optional block 1432, a RD machine 512 of L3 cache 232 determines if the coherence state associated with the target real address in L3 directory 508 indicates the target cache line is dirty. If not, meaning a backup copy of the clean target cacheline already resides in system memory 108, the RD machine 512 invalidates the target cache line in L3 directory 508 (block 1438) and returns the target cache line to L2 cache 230 (block 1436). Thereafter, the process passes to block 1418, which has been described. If, however, the RD machine 512 determines at block 1432 that the target cache line is marked as dirty in L2 directory 308 or if block 1432 is omitted, RD machine 512 causes a backup copy of the unaltered (but possibly dirty) target cache line to be retained in cache array 502 of L3 cache 232 and accordingly asserts the SC field 606 associated with the backup copy of target cache line to ensure the backup copy of the target cache line is not visible to remote processor cores 200 (block 1434). At block 1434, the RD machine 512 also sets the associated coherence field in L3 directory 508 to indicate the target cache line is dirty, HPC, and the only cached copy of the target cache line. The process then proceeds to block 1436 and following blocks, which have been described.

Referring now to block 1440 of FIG. 14B, in response to a determination that the target real address of the transactional store request misses in L3 directory 508, a RD machine 512 of L3 cache 232 causes the target cache line, if present in cache array 502, and its associated coherence state, if present in L3 directory 508, to be returned from L3 cache 232 to the associated L2 cache 230 and invalidates, if necessary, the target cache line in L3 directory 508. The RC machine 312 of L2 cache 230 then attempts to obtain a copy of the target cache line in a coherence state indicating that the L2 cache 230 is the HPC, the target cache line is the only cached copy of the target cache line, and the target cache line is dirty (block 1442). Block 1442 may entail the RC machine 312 initiating one or more operations on the system fabric.

At block 1444, the RC machine 312 determines whether or not it was successful in obtaining the target cache line in the desired coherence state. If not, the process proceeds from block 1444 to block 1450, which represents the RC machine 312 invalidating the target cache line in L2 directory 308. At block 1450, TM tracking logic 381 of L2 cache 230 additionally resets TM pass flag 410 to indicate that the memory transaction has failed. In response to TM pass flag 410 being reset, transactional control logic 382 optionally sends a TM killed indication 385 to the processor core 200. The process then ends at block 1452.

In response to a determination at block 1444 that the RC machine 312 was successful in obtaining a copy of the target cache line in the desired coherence state, TM tracking logic 381 sets the SV field 406 associated with the target cache line to identify it as part of the store footprint of the memory transaction (block 1446). The RC machine 312 additionally updates the copy of the target cache line in cache array 302 with the store data of the transactional store request (block 1448). Thereafter, the process of FIG. 14B ends at block 1452.

It should again be noted that the flowchart provided in FIGS. 14A-14B assumes that, if needed, an entries 402, 602 in TM directories 400, 600 are always available to allocate to track each transactional memory access of a memory transaction undergoing execution. If this turns out not to be the case, then TM logic 380 preferably takes appropriate actions to fail the memory transaction.

Figure 15:
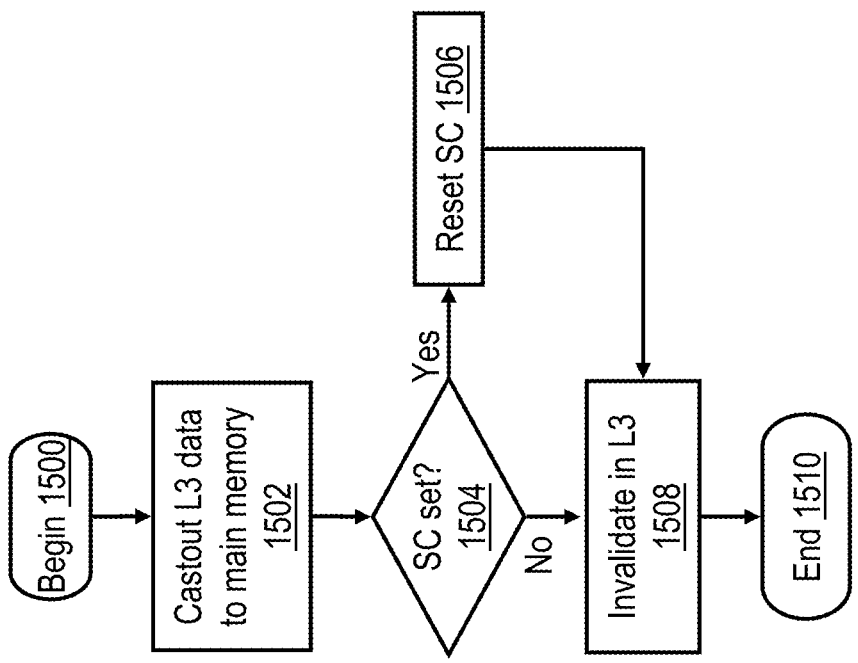
FIG. 15 is a high level logical flowchart of an exemplary method of performing a castout operation in a L3 cache supporting transactional memory.

With reference now to FIG. 15, there is illustrated a high level logical flowchart of an exemplary method of performing a castout operation in a L3 cache supporting transactional memory. The process of FIG. 15 begins at block 1500 in response to a L3 cache 232 needing to castout a cache line, for example, in response to L2 cache 230 casting in a cache line to L3 cache 232 at block 1416 of FIG. 14A. The process proceeds from block 1500 to block 1502, which illustrates a CO machine 510 of L3 cache 232 casting out a victim cache line to its system memory 108, thus removing the victim cache line from cache array 502. L3 cache 232 also determines whether or not a SC field 606 is asserted in association with the address of the victim cache line in TM directory 600 of TM tracking logic 531 (block 1504) and, if so, resets the SC field 606 (block 1506). Following block 1506 or a negative determination at block 1504, the CO machine 510 invalidates the entry for the victim cache line in L3 directory 508. Thereafter, the process of FIG. 15 ends at block 1510.

Figure 16:
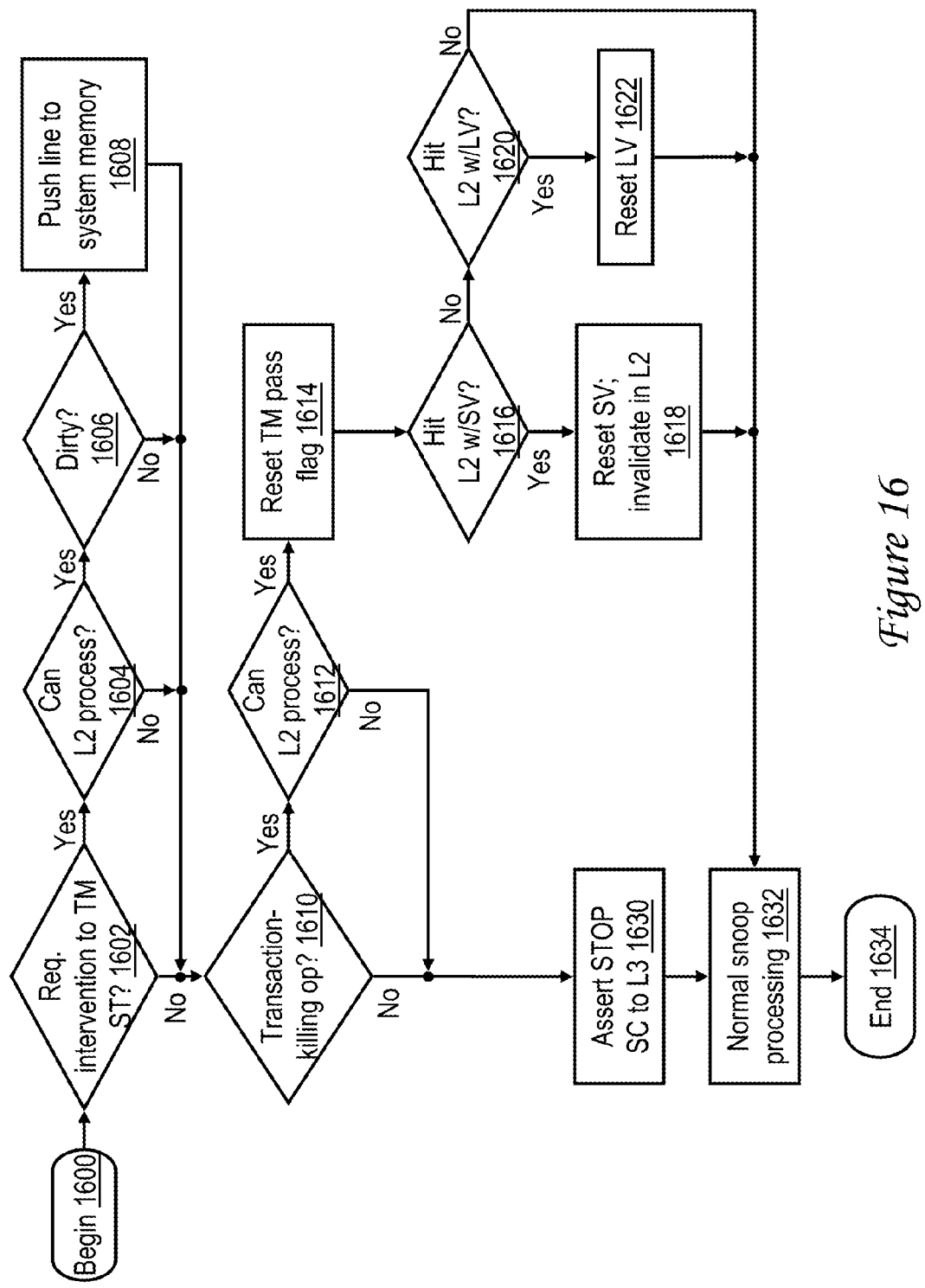
FIG. 16 is a high level logical flowchart of an exemplary method of processing a remote memory access request snooped by a L2 cache supporting transactional memory.

Referring now to FIG. 16, there is depicted a high level logical flowchart of an exemplary method of processing a remote memory access request snooped by a L2 cache supporting transactional memory. The process of FIG. 16 begins at block 1600, for example, in response to receipt by dispatch pipeline 306 of a remote memory access request received by L2 cache 230 via remote request path 326. At block 1602, dispatch logic 306 determines whether or not the transaction type is that of a request for cache-to-cache intervention of a target cache line of a transactional store request of a remote processor core 200. If not, the process proceeds to block 1610, which is described below. If, however, dispatch pipeline 306 determines that the request is a request for cache-to-cache intervention of the target cache line of a transactional store request of a remote processor core 200, dispatch pipeline 306 further determines at block 1604 whether or not L2 cache 230 is presently able to process the remote memory access request. The determination shown at block 1604 can include, for example, whether a SN machine 311 is currently idle and therefore available to service the snooped operation. If not, the process passes to block 1610, which is described below. If, however, L2 cache 230 is presently able to service the remote memory access request, dispatch pipeline 306 dispatches the remote memory access request to a SN machine 311, and the process proceeds to block 1606.

Block 1606 illustrates a determination of whether or not the target real address of the remote memory access request is dirty in L2 directory 308. If not, the process passes to block 1610, which is described below. If, however, the target real address is dirty in L2 directory 308, SN machine 311 pushes a backup copy of the target cache line to the target cache line's system memory 108 (block 1608). The backup copy of the target cache line is pushed to system memory 108 rather than to the L3 cache 232 associated with the snooping L2 cache 230 to avoid the additional complexity and consumption of bandwidth on the system fabric that would be required to have the snooping L3 cache 232 serve as a backing store for a remote processor core 200. Thereafter, the process passes to block 1610.

Block 1610 depicts dispatch pipeline 306 determining whether or not the snooped operation is a memory transaction-killing operation, that is, whether the associated processor core 200 currently has an active memory transaction as indicated by TM pass flag 408 and whether the snooped operation modifies or invalidates a cache line in the transaction footprint as indicated by TM directory 400. If not, the process passes to block 1630, which is described below. If, however, dispatch pipeline 306 determines at block 1610 that the snooped remote memory access request is a transaction killing operation, dispatch pipeline 306 also determines at block 1612 whether or not L2 cache 230 can presently service the snooped memory access request. If not, the process passes to block 1630. If, however, L2 cache 230 can presently service the snooped memory access request, dispatch pipeline 306 dispatches the snooped memory access request to a SN machine 311, which resets TM pass flag 410 to indicate failure of the memory transaction of the associated processor core 200 (block 1614). In addition, the SN machine 311 resets the relevant one of SV field 406 and LV field 408 and, if in the store footprint, invalidates the target cache line in L2 directory 308 (blocks 1616-1622). The distinction between handling of cache lines in the load and store footprints depicted at blocks 1616-1622 is made based on the different behaviors that are required during snoop processing. In particular, if a cache line has been tentatively modified by a transactional store request, then the tentatively modified copy of the cache line must be invalidated at block 1618 so that the normal snoop processing described below will find the cache line in the Invalid state. A cache line within only the load footprint of the memory transaction is not invalidated at block 1622 because L2 cache 230 may be required by the coherency protocol to intervene a copy of the cache line in response to the snooped remote memory access request (e.g., if the cache line is modified with respect to system memory 108). In such cases, the normal snoop processing discussed below may, however, invalidate the cache line in accordance with the coherency protocol. Thereafter, the process passes to block 1632.

Referring now to block 1630, L2 cache 230 asserts STOP SC channel 244 to instruct L3 cache 232 not to service the snooped remote memory access request if a SC field 606 is asserted for the target real address of the remote memory access request. The process then passes to block 1632, which illustrates L2 cache 230 performing normal snoop processing on the remote memory access request. It should be noted that this normal snoop processing is performed based on the results of the processing, if any, performed at blocks 1608, 1618 and/or 1622. The normal snoop processing can include, for example, providing a Retry coherence response if L2 cache 230 is currently unable to service the remote memory access request, or if L2 cache 230 is able to service the remote memory access request, updating a coherence state of the target cache line in L2 directory 308 and/or supplying a copy of the target cache line by cache-to-cache intervention. Following block 1632, the process of FIG. 16 ends at block 1634.

Figure 17:
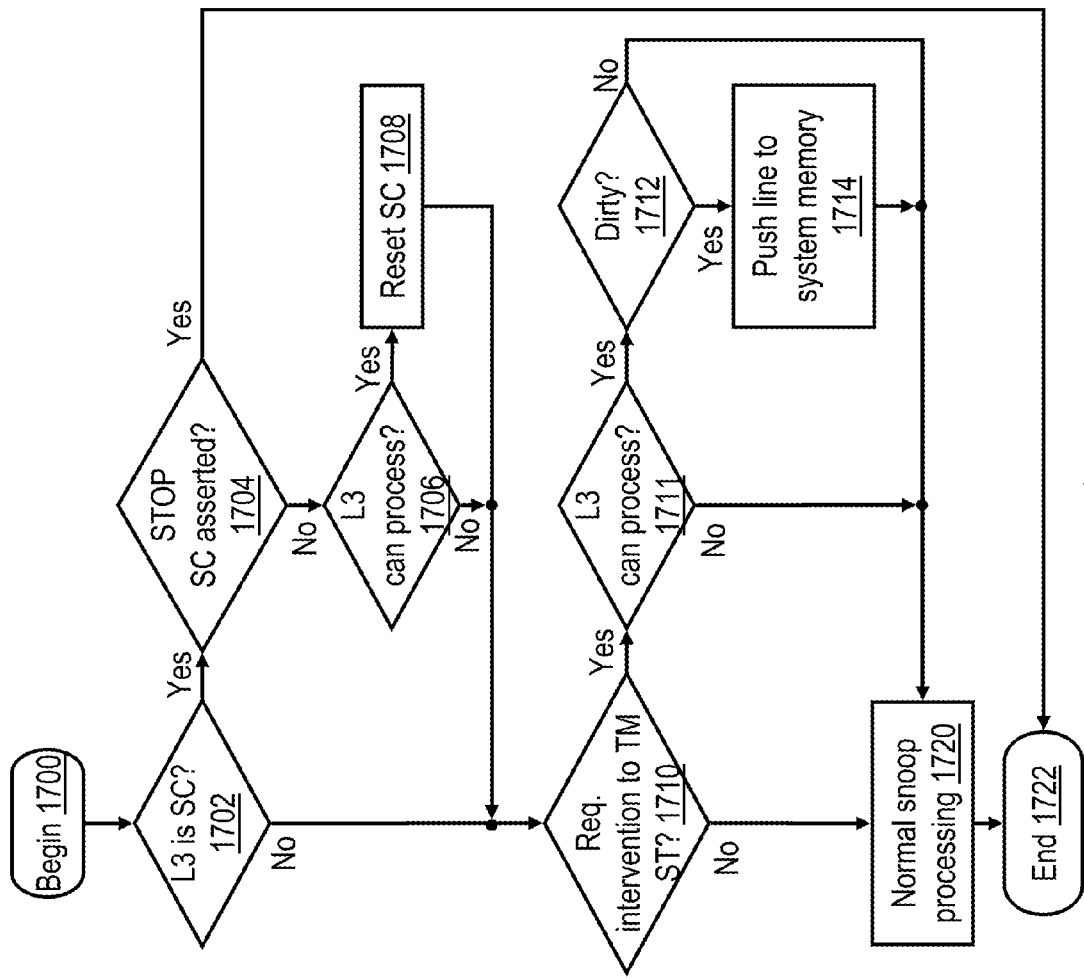
FIG. 17 is a high level logical flowchart of an exemplary method of processing a remote memory access request snooped by a L3 cache supporting transactional memory.

With reference now to FIG. 17, there is illustrated a high level logical flowchart of an exemplary method of processing a remote memory access request snooped by an L3 cache supporting transactional memory. The process begins at block 1700, for example, in response to receipt by a L3 cache 232 of a remote memory access request snooped from the system fabric. The process then proceeds to block 1702, which illustrates dispatch pipeline 506 determining if a SC field 606 is set in association with the target real address of the remote memory access request in TM directory 600. If not, the process proceeds to block 1710, which is described below. If, however, dispatch pipeline 506 determines that a SC field 606 is set for the target real address of the remote memory access request in TM directory 600, dispatch pipeline 506 further determines at block 1704 whether or not the associated L2 cache 230 has asserted STOP SC signal 244. If so, processing of the remote memory access request by L3 cache 232 is terminated, and the process of FIG. 17 ends at block 1722.

Returning to block 1704, in response to a determination that L2 cache 230 has not asserted STOP SC signal 244, L2 cache 232 determines whether or not L3 cache 232 is currently able to service the snooped remote memory access request. The determination depicted at block 1706 can include, for example, a determination of whether or not a SN machine 511 is idle and therefore available for allocation to service the remote memory access request. If not, the process passes to block 1710, which is described below. If, however, L3 cache 232 is presently able to service the remote memory access request, L3 cache 232 resets the SC field 606 in TM directory 600 associated with the target real address of the snooped remote memory access request (block 1708). The process then proceeds to block 1710.

Block 1710 depicts L3 cache 232 determining whether or not the transaction type of the remote memory access request is that of a request for cache-to-cache intervention of a target cache line of a transactional store request of a remote processor core 200. If not, the process passes to block 1720, which is described below. If, however, L3 cache 232 determines at block 1710 that the transaction type of the remote memory access request indicates that it is a request for cache-to-cache intervention of a target cache line of a transactional store request of a remote processor core 200, L3 cache 232 additionally determines at block 1711 whether or not L3 cache 232 is currently able to service the remote memory access request. As noted above with respect to block 1706, the determination depicted at block 1711 can include, for example, a determination of whether or not a SN machine 511 is idle and therefore available for allocation to service the remote memory access request. If not, the process passes to block 1720, which is described below. If, however, L3 cache 232 is presently able to service the remote memory access request, L3 cache 232 additionally determines at block 1712 whether or not L3 directory 508 associates the target real address of the remote memory access request with a dirty coherence state. If not, the process proceeds directory to block 1720. If, however, the target real address is associated with a dirty coherence state in L3 directory 508, L3 cache 232 pushes a backup copy of the target cache line to the target cache line's system memory 108 (block 1714). The backup copy of the target cache line is pushed to system memory 108 rather than retained in the snooping L3 cache 232 to avoid the additional complexity and consumption of bandwidth on the system fabric that would be required for the snooping L3 cache 232 to serve as a backing store for a remote processor core 200. Thereafter, the process passes to block 1720.

Block 1720 depicts L3 cache 232 performing normal snoop processing on the snooped request. The normal snoop processing can include, for example, providing a Retry coherence response if L3 cache 232 is currently unable to service the snooped request, or if L3 cache 232 is able to service the snooped request, updating a coherence state of the target cache line in L3 directory 508 and/or supplying a copy of the target cache line by cache-to-cache intervention. Following block 1720, the process of FIG. 17 ends at block 1722.

Figure 18:
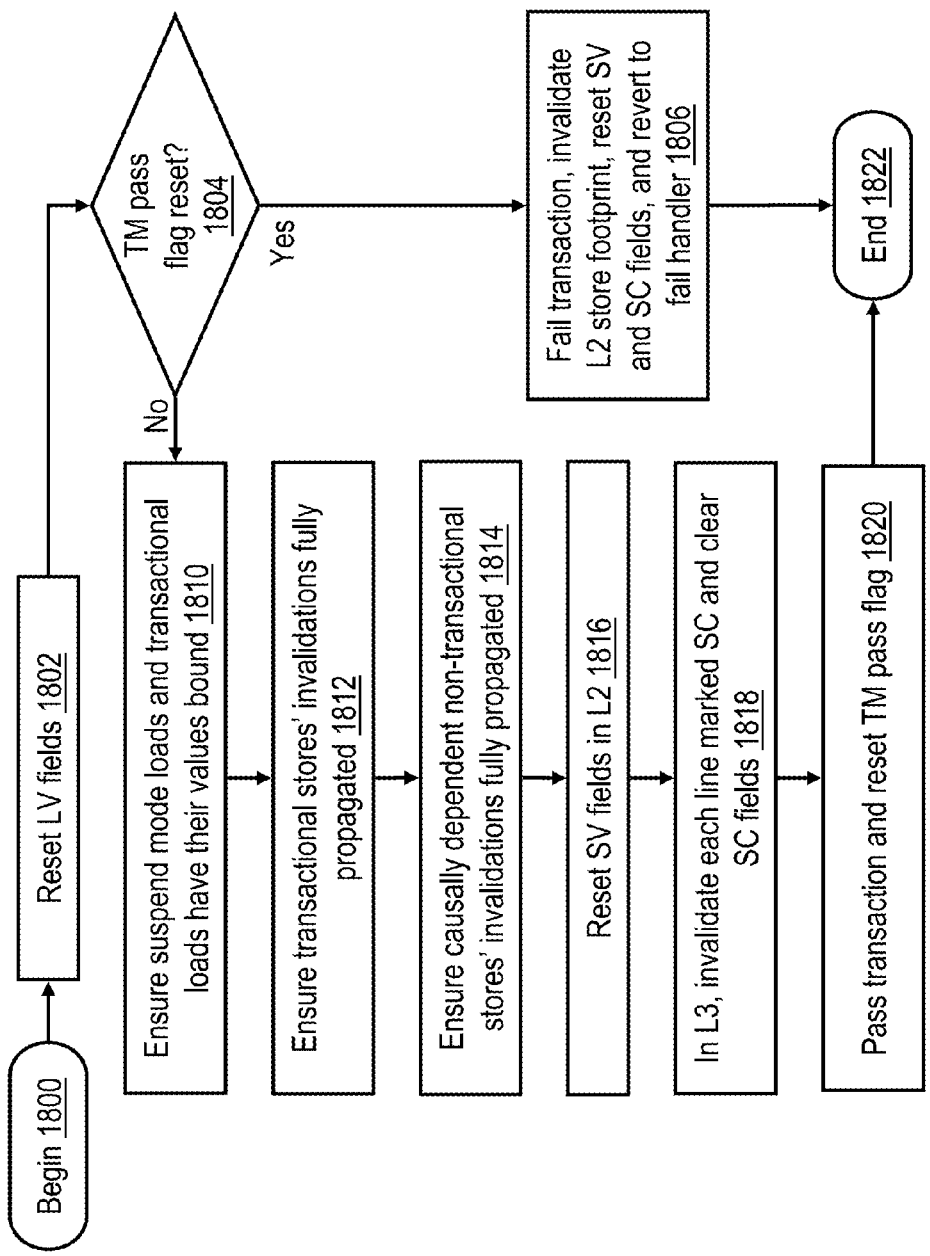
FIG. 18 is a high level logical flowchart of an exemplary method of processing a tend instruction terminating a memory transaction.

Referring now to FIG. 18, there is depicted a high level logical flowchart of the processing of a tend instruction terminating a memory transaction in accordance with one embodiment. The process begins at block 1800, for example, in response to execution of a tend instruction within the LSU 202 of a processor core 200. The process of FIG. 18 proceeds from block 1800 to block 1802, which depicts the associated L2 cache 230 resetting all LV fields 408 in TM directory 400. At block 1804, L2 cache 230 determines whether or not TM pass flag 410 has been reset to indicate that the memory transaction has failed, for example, due to a conflicting access to the memory transaction's footprint. If not, the process passes to block 1810, which is described below. If, however, L2 cache 230 determines at block 1804 that the TM pass flag 410 has been reset, the process passes to block 1806, which depicts transactional control logic 382 directing recovery from the failure of the memory transaction. This process includes indicating to processor core 200 via pass/fail indication 384 that the memory transaction has failed, invalidating the tentative store footprint of the memory transaction in L2 directory 308, resetting all SV field 406 in TM directory 400, signaling L3 cache 232 via TM END channel 246 to reset all SC fields 606 to make visible any cache line(s) for which the associated SC field 606 was set. As further illustrated at block 1806, in response to pass/fail indication 384 processor core 200 updates its condition code register and transfers control to the fail handling branch instruction within the memory transaction. Thereafter, the process of FIG. 18 ends at block 1822.

Referring now to block 1810 to commit a passing memory transaction to the distributed shared memory system, LSU 202 ensures that all prior suspend mode load instructions and all prior transactional load instructions have their values bound. This check ensures the transactional load instructions are present in the memory transaction's footprint and that the suspend mode load instructions have obtained their values. In addition, at block 1812, L2 cache 230 ensures that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. The process then proceeds to step 1814, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

The process then proceeds to block 1816-1820, which depict transactional control logic 382 of L2 cache 230 directing commitment of the memory transaction to the distributed shared memory system. In particular, at block 1816, transactional control logic 382 resets all LV fields 408 in TM directory 400. In addition, at block 1818, transactional control logic 382 directs L3 cache 232 via TM END channel 246 to invalidate in L3 directory 508 each cache line for which the corresponding SC fields 606 are set and then to reset all SC fields 606. Further, at block 1820, transactional control logic 382 indicates to processor core 200 via pass/fail indication 384 that the memory transaction passed and resets TM pass flag 410. The process of FIG. 18 then terminates at block 1822.

Figure 19:
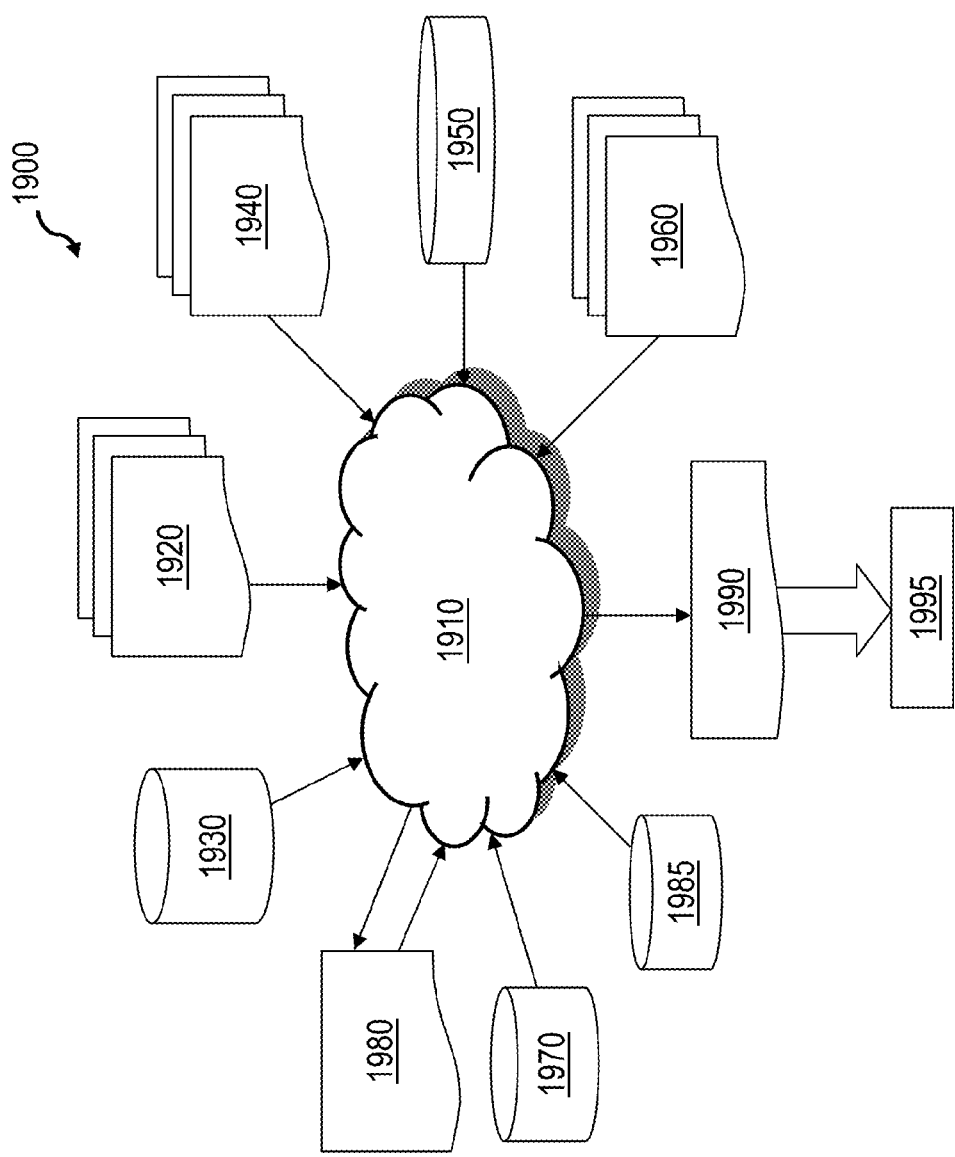
FIG. 19 is a data flow diagram illustrating a design process.

With reference now to FIG. 19, there is depicted a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown herein. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 19 illustrates multiple such design structures including an input design structure 1020 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown herein. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown herein to generate a netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1910 may include hardware and software modules for processing a variety of input data structure types including netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 1970, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1990 may comprise a compiled, executable HDL simulation model that functionally simulates the devices shown herein.

Design structure 1990 may also employ a data format used for the exchange of layout data of integrated circuits and/or symbolic data format (e.g., information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1990 may then proceed to a stage 1995 where, for example, design structure 1990: proceeds to tape-out, is released to manufacturing, is released to a mask house, is sent to another design house, is sent back to the customer, etc.

As has been described, in at least one embodiment, in response to a transactional store request, the higher level cache transmits, to the lower level cache, a backup copy of an unaltered target cache line in response to a target real address hitting in the higher level cache, updates the target cache line with store data to obtain an updated target cache line, and records the target real address as belonging to a transaction footprint of the memory transaction. In response to a conflicting access to the transaction footprint prior to completion of the memory transaction, the higher level cache signals failure of the memory transaction to the processor core, invalidates the updated target cache line in the higher level cache, and causes the backup copy of the target cache line in the lower level cache to be restored as a current version of the target cache line.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including a system memory, the processing unit comprising:
   a processor core;
   a lower level cache;
   a higher level cache coupled to the processor core and to the lower level cache, wherein the higher level cache is configured to perform:
      responsive to receipt at the higher level cache of a transactional store request of the processor core generated by execution of a transactional store instruction within a memory transaction, the transactional store request specifying a target real address of a target cache line and store data:
         in response to the target real address hitting in the higher level cache, the higher level cache transmitting, to the lower level cache, a backup copy of the target cache line unaltered by the store data, wherein the higher level cache transmits the backup copy of the target cache line to the lower level cache only in response to the target cache line having a dirty coherence state in the higher level cache and not already being recorded as belonging to a transaction footprint of the memory transaction;
         the higher level cache updating the target cache line with the store data to obtain an updated target cache line;
         the higher level cache recording the target real address as belonging to the transaction footprint of the memory transaction; and
      responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line.

2. A data processing system, comprising:
   a plurality of processing units in accordance with claim 1; and
   an interconnect fabric coupling the plurality of processing units.

3. A processing unit, comprising:
   a processor core;
   a lower level cache;
   a higher level cache coupled to the processor core and to the lower level cache, wherein the higher level cache is configured to perform:
      responsive to receipt at the higher level cache of a transactional store request of the processor core generated by execution of a transactional store instruction within a memory transaction, the transactional store request specifying a target real address of a target cache line and store data:
         in response to the target real address hitting in the higher level cache, the higher level cache transmitting, to the lower level cache, a backup copy of the target cache line unaltered by the store data;
         the higher level cache updating the target cache line with the store data to obtain an updated target cache line;
         the higher level cache recording the target real address as belonging to a transaction footprint of the memory transaction; and responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;

wherein the lower level cache is configured to perform:
responsive to the target real address hitting in the lower level cache, the lower level cache transmitting, to the higher level cache, a copy of the target cache line for modification with the store data and the lower level cache retaining a backup copy of the target cache line unaltered by the store data.

4. A processing unit for a data processing system including a system memory, the processing unit comprising:
a processor core;
a lower level cache;
a higher level cache coupled to the processor core and to the lower level cache, wherein the higher level cache is configured to perform:
responsive to receipt at the higher level cache of a transactional store request of the processor core generated by execution of a transactional store instruction within a memory transaction, the transactional store request specifying a target real address of a target cache line and store data:
in response to the target real address hitting in the higher level cache, the higher level cache transmitting, to the lower level cache, a backup copy of the target cache line unaltered by the store data;
the higher level cache updating the target cache line with the store data to obtain an updated target cache line;
the higher level cache recording the target real address as belonging to a transaction footprint of the memory transaction; and
responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
wherein:
the transactional store request is a first transactional store request;
the target cache line is a first target cache line;
the target real address is a first target real address; and
the higher level cache is further configured to perform:
in response to snooping at the higher level cache a second transactional store request of a remote processor core among the plurality of processor cores, the second transactional store request specifying a second target real address of a second target cache line:
determining whether the second target real address hits in the higher level cache in a dirty coherence state; and
in response to determining that the second target real address hits in the higher level cache in a dirty coherence state, pushing a backup copy of the second target cache line from the higher level cache to the system memory.

5. The processing unit of claim 4, wherein the lower level cache is configured to perform:
in response to snooping at the lower level cache the second transactional store request of the remote processor core:
determining whether the second target real address hits in the lower level cache in a dirty coherence state; and
in response to determining that the second target real address hits in the lower level cache in a dirty coherence state, pushing a backup copy of the second target cache line from the lower level cache to the system memory.

6. A processing unit, comprising:
a processor core;
a lower level cache;
a higher level cache coupled to the processor core and to the lower level cache, wherein the higher level cache is configured to perform:
responsive to receipt at the higher level cache of a transactional store request of the processor core generated by execution of a transactional store instruction within a memory transaction, the transactional store request specifying a target real address of a target cache line and store data:
in response to the target real address hitting in the higher level cache, the higher level cache transmitting, to the lower level cache, a backup copy of the target cache line unaltered by the store data;
the higher level cache updating the target cache line with the store data to obtain an updated target cache line;
the higher level cache recording the target real address as belonging to a transaction footprint of the memory transaction; and
responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
wherein:
the lower level cache is coupled to the higher level cache in a lookaside configuration; and
the higher level cache controls snooping of remote memory access requests by the lower level cache.

7. A design structure tangibly embodied in a machine-readable storage device for designing, manufacturing, or testing an integrated circuit, the design structure comprising:
a processing unit, including:
a processor core;
a lower level cache;
a higher level cache coupled to the processor core and to the lower level cache, wherein the higher level cache is configured to perform:
responsive to receipt at the higher level cache of a transactional store request of the processor core generated by execution of a transactional store instruction within a memory transaction, the transactional store request specifying a target real address of a target cache line and store data:
in response to the target real address hitting in the higher level cache, the higher level cache transmitting, to the lower level cache, a backup copy of the target cache line unaltered by the store data;
the higher level cache updating the target cache line with the store data to obtain an updated target cache line;
the higher level cache recording the target real address as belonging to a transaction footprint of the memory transaction; and
responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
wherein:
the processing unit belongs to a data processing system including a system memory;
the higher level cache transmits the backup copy of the target cache line to the lower level cache only in response to the target cache line having a dirty coherence state in the higher level cache and not already being recorded as belonging to the transaction footprint.

8. The design structure of claim 7, wherein the design structure comprises a hardware description language (HDL) design structure.

9. A design structure tangibly embodied in a machine-readable storage device for designing, manufacturing, or testing an integrated circuit, the design structure comprising:
a processing unit, including:
a processor core;
a lower level cache;
a higher level cache coupled to the processor core and to the lower level cache, wherein the higher level cache is configured to perform:
responsive to receipt at the higher level cache of a transactional store request of the processor core generated by execution of a transactional store instruction within a memory transaction, the transactional store request specifying a target real address of a target cache line and store data:
in response to the target real address hitting in the higher level cache, the higher level cache transmitting, to the lower level cache, a backup copy of the target cache line unaltered by the store data;
the higher level cache updating the target cache line with the store data to obtain an updated target cache line;
the higher level cache recording the target real address as belonging to a transaction footprint of the memory transaction; and
responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
wherein the lower level cache is configured to perform:
responsive to the target real address hitting in the lower level cache, the lower level cache transmitting, to the higher level cache, a copy of the target cache line for modification with the store data and the lower level cache retaining a backup copy of the target cache line unaltered by the store data.

10. A design structure tangibly embodied in a machine-readable storage device for designing, manufacturing, or testing an integrated circuit, the design structure comprising:
a processing unit, including:
a processor core;
a lower level cache;
a higher level cache coupled to the processor core and to the lower level cache, wherein the higher level cache is configured to perform:
responsive to receipt at the higher level cache of a transactional store request of the processor core generated by execution of a transactional store instruction within a memory transaction, the transactional store request specifying a target real address of a target cache line and store data:
in response to the target real address hitting in the higher level cache, the higher level cache transmitting, to the lower level cache, a backup copy of the target cache line unaltered by the store data;
the higher level cache updating the target cache line with the store data to obtain an updated target cache line;
the higher level cache recording the target real address as belonging to a transaction footprint of the memory transaction; and
responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
wherein:
the processing unit belongs to a data processing system including a system memory;
the transactional store request is a first transactional store request;
the target cache line is a first target cache line;
the target real address is a first target real address; and
the higher level cache is further configured to perform:
in response to snooping at the higher level cache a second transactional store request of a remote processor core among the plurality of processor cores, the second transactional store request specifying a second target real address of a second target cache line:
determining whether the second target real address hits in the higher level cache in a dirty coherence state; and
in response to determining that the second target real address hits in the higher level cache in a dirty coherence state, pushing a backup copy of the second target cache line from the higher level cache to the system memory.

11. The design structure of claim 10, wherein the lower level cache is configured to perform:

in response to snooping at the lower level cache the second transactional store request of the remote processor core:
    determining whether the second target real address hits in the lower level cache in a dirty coherence state; and
    in response to determining that the second target real address hits in the lower level cache in a dirty coherence state, pushing a backup copy of the second target cache line from the lower level cache to the system memory.

12. A design structure tangibly embodied in a machine-readable storage device for designing, manufacturing, or testing an integrated circuit, the design structure comprising:
  a processing unit, including:
    a processor core;
    a lower level cache;
    a higher level cache coupled to the processor core and to the lower level cache, wherein the higher level cache is configured to perform:
      responsive to receipt at the higher level cache of a transactional store request of the processor core generated by execution of a transactional store instruction within a memory transaction, the transactional store request specifying a target real address of a target cache line and store data:
        in response to the target real address hitting in the higher level cache, the higher level cache transmitting, to the lower level cache, a backup copy of the target cache line unaltered by the store data;
        the higher level cache updating the target cache line with the store data to obtain an updated target cache line;
        the higher level cache recording the target real address as belonging to a transaction footprint of the memory transaction; and
      responsive to a conflicting access to the transaction footprint prior to completion of the memory transaction, the higher level cache signaling failure of the memory transaction to the processor core, invalidating the updated target cache line in the higher level cache, and causing the backup copy of the target cache line in the lower level cache to be restored as a current version of the target cache line;
  wherein:
    the lower level cache is coupled to the higher level cache in a lookaside configuration; and
    the higher level cache controls snooping of remote memory access requests by the lower level cache.

* * * * *